US012743679B2

(12) United States Patent
Avoyan et al.

(10) Patent No.: US 12,743,679 B2
(45) **Date of Patent: *Sep. 22, 2026**

(54) SYSTEMS AND METHODS FOR TEMPLATE IMAGE EDITS

(71) Applicant: PICSART, INC., Hallandale Beach, FL (US)

(72) Inventors: Hovhannes Avoyan, San Francisco, CA (US); Artavazd Mehrabyan, Yerevan (AM); Lusine Harutyunyan, Hazlet, NJ (US); Mikayel Vardanyan, Yerevan (AM); Aram Mkhitaryan, Yerevan (AM)

(73) Assignee: PICSART, INC., Hallandale Beach, FL (US)

( * ) Notice: Subject to any disclaimer, the term of this patent is extended or adjusted under 35 U.S.C. 154(b) by 112 days.

This patent is subject to a terminal disclaimer.

(21) Appl. No.: 18/638,831

(22) Filed: Apr. 18, 2024

(65) Prior Publication Data

US 2024/0265602 A1 Aug. 8, 2024

Related U.S. Application Data

(63) Continuation of application No. 17/889,375, filed on Aug. 16, 2022, now Pat. No. 11,989,808, which is a (Continued)

(51) Int. Cl.
*G06T 11/60* (2026.01)
*G06F 3/14* (2006.01)
(Continued)

(52) U.S. Cl.
CPC ............ *G06T 11/60* (2013.01); *G06K 7/1417* (2013.01); *G06F 3/1454* (2013.01); (Continued)

(58) Field of Classification Search
CPC ... G06T 11/60; G06T 2210/22; G06K 7/1417; G06F 3/1454; G06Q 10/101; G06Q 50/01; G11B 27/031; G11B 27/34
See application file for complete search history.

(56) References Cited

U.S. PATENT DOCUMENTS 6,970,639 B1 * 11/2005 McGrath ................ G11B 27/28 386/281
8,234,591 B1 * 7/2012 Dhawan ............. G06F 3/04845 715/825

(Continued)

*Primary Examiner* — YuJang Tswei
(74) *Attorney, Agent, or Firm* — Arluys IP, P.C.

(57) ABSTRACT

Aspects presented herein include systems and methods for editing images (still or video images). In embodiments, edit information is captures and associate with an edited image (e.g., a “remix” image). The remix image and its associated edit information may be readily shared with other users. In embodiments, users can see the creator’s editing steps used to achieve the end result via interactive “cards” that may be displayed with the remix image. In embodiments, a player application uses the captured edit information to allow users to “replay” some or all of those edits on an image. The remix-replay embodiments provide: (1) unique ways for capturing edits and parameter adjustments for being applied onto a different image; (2) unique ways for observing how the image was edited for learning how to replicate edits; and (3) unique ways for applying some or all of those edits during editing.

20 Claims, 27 Drawing Sheets

Related U.S. Application Data continuation of application No. 16/938,623, filed on Jul. 24, 2020, now Pat. No. 11,450,047.

(60) Provisional application No. 62/879,386, filed on Jul. 26, 2019.

(51) Int. Cl.

| | |
|---|---|
| ***G06K 7/14*** | (2006.01) |
| ***G06Q 10/101*** | (2023.01) |
| ***G06Q 10/40*** | (2026.01) |
| ***G11B 27/031*** | (2006.01) |
| ***G11B 27/34*** | (2006.01) |

(52) U.S. Cl.

CPC ........... *G06Q 10/101* (2013.01); *G06Q 10/40* (2026.01); *G06T 2210/22* (2013.01); *G11B 27/031* (2013.01); *G11B 27/34* (2013.01)

(56) References Cited

U.S. PATENT DOCUMENTS

| | | | | | |
|---|---|---|---|---|---|
| 2003/0086691 | A1* | 5/2003 | Yu | G11B 27/34 | 386/243 |
| 2004/0044732 | A1* | 3/2004 | Fushiki | G06T 11/60 | 709/205 |
| 2007/0200872 | A1* | 8/2007 | Bowie | G06F 16/4393 | 345/619 |
| 2009/0013036 | A1* | 1/2009 | Kim | G06T 11/60 | 709/203 |
| 2012/0042251 | A1* | 2/2012 | Rodriguez | G11B 27/034 | 715/723 |
| 2013/0236093 | A1* | 9/2013 | Gatt | G06F 3/04845 | 382/311 |
| 2013/0239056 | A1* | 9/2013 | Ubillos | G06F 3/04847 | 715/833 |
| 2013/0239057 | A1* | 9/2013 | Ubillos | G06F 3/04842 | 715/833 |
| 2014/0133782 | A1* | 5/2014 | Asver | H04N 1/00159 | 382/309 |
| 2014/0331126 | A1* | 11/2014 | Hunter | G06F 40/197 | 715/256 |

* cited by examiner

500

600

700A

700B

800

900A

1000A

1100

1200

1300

FIG. 14
Cancel
Apply
RECENT
FLTR
FX
MAGIC
BLUR
ARTISTIC
STEP 4 OF 4: EFFECTS

1400

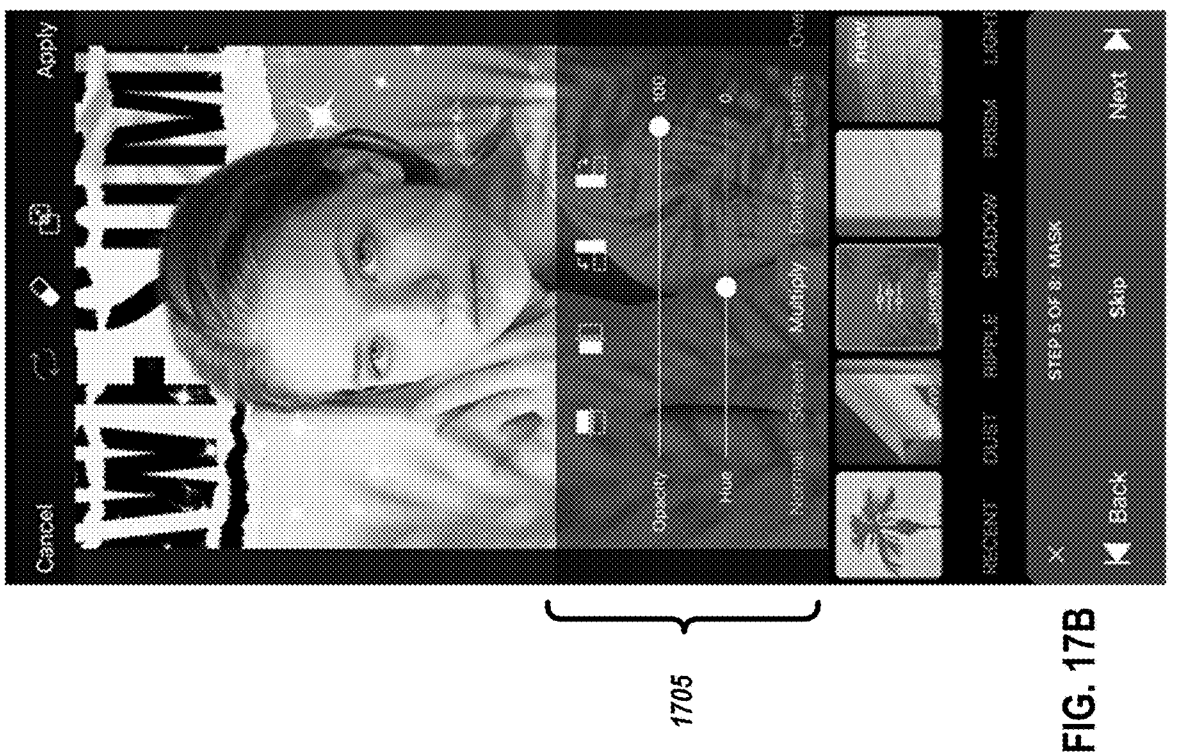
FIG. 17B
FIG. 17A

2100

SYSTEMS AND METHODS FOR TEMPLATE IMAGE EDITS

CROSS-REFERENCE TO RELATED APPLICATION

This application claims the benefit under 35 U.S.C. § 120 as a continuation of U.S. patent application Ser. No. 17/889,375, filed on Aug. 16, 2022, entitled "SYSTEMS AND METHODS FOR TEMPLATE IMAGE EDITS", listing, Hovhannes Avoyan, Artavazd Mehrabyan, Lusine Harutyunyan, Mikayel Vardanyan, and Aram Mkhitaryan as inventors, which claims the benefit under 35 U.S.C. § 120 as a continuation of U.S. patent application Ser. No. 16/938,623, filed Jul. 24, 2020, entitled "SYSTEMS AND METHODS FOR SHARING IMAGE DATA EDITS," listing, Hovhannes Avoyan, Artavazd Mehrabyan, Lusine Harutyunyan, Mikayel Vardanyan, and Aram Mkhitaryan as inventors, which claims the priority benefit under 35 USC § 119(e) to U.S. Prov. Pat. App. Ser. No. 62/879,386, filed Jul. 26, 2019, entitled "SYSTEMS AND METHODS FOR SHARING OF IMAGE EDITS," and listing Hovhannes Avoyan, Artavazd Mehrabyan, Lusine Harutyunyan, Mikayel Vardanyan, and Aram Mkhitaryan as inventors. Each of the aforementioned patent document is incorporated by reference herein in its entirety and for all purposes. The applicant(s) hereby rescind any disclaimer of claim scope in the parent application(s) or the prosecution history thereof and advise the USPTO that the claims in this application may be broader than any claim in the parent application(s).

COPYRIGHT NOTICE

A portion of the disclosure of this patent document contains material that is subject to copyright protection. The copyright owner has no objection to the facsimile reproduction by anyone of the patent document, as it appears in the Patent and Trademark Office patent file or records, but otherwise reserves all copyright rights whatsoever.

BACKGROUND

Technical Field

The present disclosure relates editing digital images, more particularly, to systems and methods for editing digital image data (video and/or still images) using the information of editing steps for other edited image data.

Description of the Related Art

With the advent of social networking services, users share photos and videos using a software application, such as Instagram, which is owned by Facebook, Inc., a company located in Menlo Park, California, U.S.A, and PicsArt, a company headquartered in San Francisco, California. Typically, such an application allows users to upload photos and videos to a networked service, which can be edited with various filters, and organized with tags and other information, such as user accounts. A user's posts may be shared with all of the public or with a subset of the public, such as a set of pre-approved followers. A user can browse other users' content by tags and data, and may follow other users to add their content to a feed, which is place where a user can receive content and may also share and connect with others.

In general, there are many steps involved in creating either a professional-looking or elaborately edited piece of content (e.g., photo or video image). These steps may include the use of multiple editing tools (e.g., filters, special effects, brushes, drawing) and/or image assets (e.g., stickers, text, templates). Each of the editing tools and the image assets may also have their own settings or adjustments, which makes the edit even more complex. Furthermore, the order in which the editing occurred may dramatical affect the final appearance of edited image data.

Some users who edit content would like to share their editing processes with others, but current methods of sharing are time-consuming and inefficient. For example, users may make a video or screen recording of the editing steps or share screenshots with long step-by-step descriptions. Even given the screenshots or videos, if different operating systems or different versions of the application are used, a person attempting to follow the video or screen recording may not be able to follow since the menus and/or features may be different or unavailable. Furthermore, it may not be clear, or it may be not be possible, to share the particular settings for a tool.

Thus, there is a need for systems and methods that allow content creators to easily and efficiently share the information of their editing processes with others and systems and methods that allow others to apply the same or similar edits in a simple and efficient manner.

BRIEF DESCRIPTION OF THE DRAWINGS

References will be made to embodiments of the present disclosure, examples of which may be illustrated in the accompanying figures. These figures are intended to be illustrative, not limiting. Although the present disclosure is generally described in the context of these embodiments, it should be understood that it is not intended to limit the scope of the present disclosure to these particular embodiments.

FIGS. 17A-D depict the replay navigation interface of some edit steps for a replay sequence of edits for the image depicted in FIG. 10B with an alternative replay navigator interface, according to embodiments of the present disclosure

DETAILED DESCRIPTION OF THE EMBODIMENTS

Figure 1:
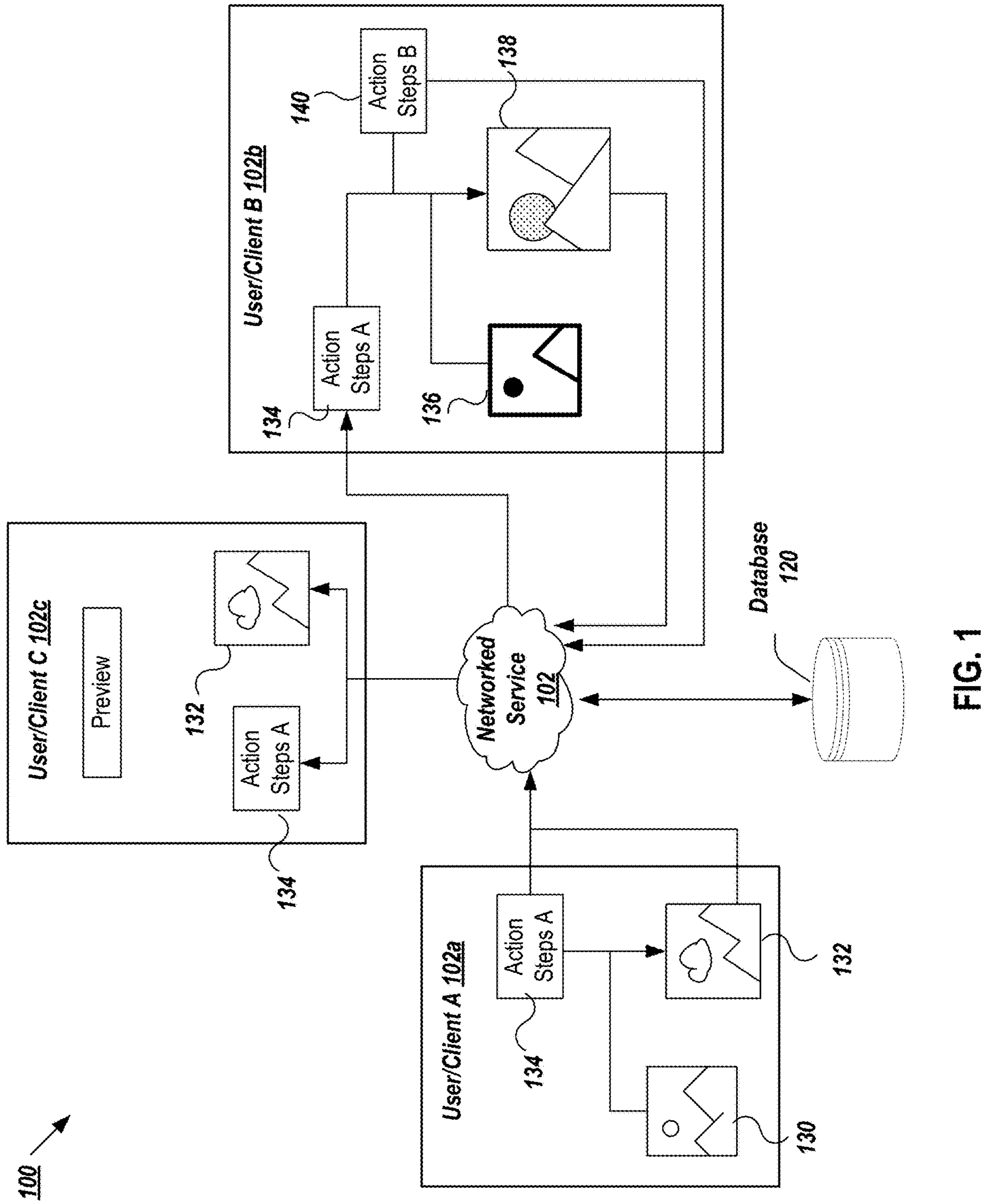
FIG. 1 shows a schematic diagram of a network environment according to embodiments of the present disclosure.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," and "comprising" shall be understood to be open terms, and any examples are provided by way of illustration and shall not be used to limit the scope of this disclosure.

A service, function, or resource is not limited to a single service, function, or resource; usage of these terms may refer to a grouping of related services, functions, or resources, which may be distributed or aggregated. The use of memory, database, information base, data store, tables, hardware, cache, and the like may be used herein to refer to system component or components into which information may be entered or otherwise recorded. The terms "data," "information," along with similar terms, may be replaced by other terminologies referring to a group of one or more bits, and may be used interchangeably. The terms "packet" or "frame" shall be understood to mean a group of one or more bits. The term "frame" shall not be interpreted as limiting embodiments of the present invention to Layer 2 networks; and, the term "packet" shall not be interpreted as limiting embodiments of the present invention to Layer 3 networks. The terms "packet," "frame," "data," or "data traffic" may be replaced by other terminologies referring to a group of bits, such as "datagram" or "cell." The words "optimal," "optimize," "optimization," and the like refer to an improvement of an outcome or a process and do not require that the specified outcome or process has achieved an "optimal" or peak state.

It shall be noted that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

It shall also be noted that although embodiments described herein may be within the context of still images, aspects of the present disclosure are not so limited. Accordingly, the aspects of the present disclosure may be applied or adapted for use in other contexts, such as multimedia, videos, web pages, documents, and the like.

It shall be noted that any examples and results provided herein are provided by way of illustration and were performed under specific conditions using a specific embodiment or embodiments; accordingly, neither these experiments nor their results shall be used to limit the scope of the disclosure of the current patent document. It shall also be noted that references to an application, such as an image editing application, may be a mobile application, a standalone computer application, or may be accessed via a web browser.

In the conventional approach that uses video tutorials or screen-recordings, image creators have traditionally recorded their editing processes as screen recorded videos and posted the videos on websites, such as YouTube's video sharing service or Vimeo's video platform. This approach is a cumbersome process, and it is almost impossible for viewers to replicate the processes effectively. A creator may be able to capture their editing steps through lengthy recordings, but communication and replication of those steps is difficult at best. In order to effectively replicate what a viewer is watching, the viewer must watch and rewatch the video multiple times, transitioning between the video and the editing software after each step of the edit. This process is made even more difficult if the version of the software used by the watcher is not the same as was used in the recording. Thus, a watcher of the tutorial may not be able to find the corresponding editing tool or features as access to it may have changed (e.g., a different interface), it may not be available (e.g., feature is part of a different subscription service or may have been removed, changed, or renamed), etc. Furthermore, it is extremely difficult, if not impossible, to convey the parameters applied for the tool (e.g., crop size, position information, exact color profile, etc.).

Some conventional mobile applications, such as Canva graphic-design tool, offer "templates." These applications use prepositioned shapes and texts that a user can replace with her own. For example, a user may utilize a greeting card template to create a birthday card by replacing generic images with her own and altering the salutation with his/her own words. Templates save users time, but they: (a) do not effectively reveal the nuances of what the creator of the templates did and how he achieved the outcome; (b) do not teach users how to use new tools, editing methods, or assets, such as stickers, (c) do not improve user's editing abilities or techniques; and (d) for more complex edit tools, do not provide the settings/parameters applied. Furthermore, templates are not user-generated content, which is an extremely important feature because it promotes more engagement, allows for more varied and complex assortment of edits, and allows for generational development (e.g., edits based upon other edits). Instead, templates are created and made available by the respective company's staff members. Thus, these templates tend to be more limited and do allow access to the creativity of the multitude of uses of a network service, such as PicsArt of San Francisco, California.

Similar to templates, some conventional mobile applications, such as the Snapseed application, offer tools, such as "presets," "filters," or "Looks." These tools can be applied with minimal effort by users, but each is technically a filter or set of combined filters (usually at most a few edits) applied all-at-once to a user's image. These features are typically are generically offered within an application, and thus, they may not be user-generated content, do not allow users to create different features, do not support modifications from the set features, and/or do not provide mechanisms by which other users can readily share the features. To the extent that any sharing is allowed, it is typically done by creating a code, which requires additional software, that creates a link to a tool that is the edits. Such a system is cumbersome and since all the edits are a single feature, they cannot readily be examined or altered.

1. GENERAL OVERVIEW

FIG. 1 shows a graphical representation of a network environment 100, according to embodiments of the present document. As depicted in FIG. 1, user devices (or client devices) 102*a*-102*c* may be communicatively coupled to a networked service 102 via a network, such as the Internet (or cloud), which may include access to one or more datastores/databases 120. Even though only three users and one datastore are shown in FIG. 1, it shall be noted that other numbers of users and datastores may be communicatively coupled to the network service 120.

In one or more embodiments, the user of a user device (e.g., 102*a*) employing an image editing application may edit an original image 130 into an edited image 132 and store the editing process in a file(s) 134, which comprises information regarding the set of action/edit steps involved in converted the original image 130 into the edited image 132. It shall be noted that the term "original image" means an image at the start of an edit project, which may be a completely unaltered image or may be a previously altered or edited image. In one or more embodiments, the file 134 may be uploaded to the networked service 102, which may be a cloud-based service. In one or more embodiments, the user may also upload the edited image 132 to the networked service 102, as depicted in FIG. 1, or alternatively, the action/edit steps 134, which may be referred to as replay edit data, and edited image 132 may be a single file or package that are uploaded together. In one or more embodiments, the term image refers to photos, videos, or any other multimedia data in various data formats that may be edited by user.

In one or more embodiments, the network service 102 may include a posting or sharing service that facilitates sharing of content to one or more third parties. For example, each user device 102 may include as part of the editing application, or in addition to, an interface for receiving content. As will be explained in more detail below, each user device 102 may include as part of the editing application, or in addition to, a replay navigation interface or player that facilitates editing using replay edit data (e.g., edit data 134).

In one or more embodiments, the edited image 132 and the file 134, which are uploaded to the networked service 102 by the user device 102*a*, may be downloaded onto other users' devices (e.g., devices 102*b* and/or 102*c*). In embodiments, a user of the device 102*b* may edit his own image 136 to generate an edited image 138, based on the steps in the file 134. In one or more embodiments, the user of the device 102*b* may further edit the image 136 according to his own steps, and, in one or more embodiments, the steps taken by User B may be stored in a file 140. In one or more embodiments, the file 140 and the edited image 138 may also be uploaded to a networked service (or cloud service) 102 in like manner as for User A. In one or more embodiments, the edited images and the files that include the editing steps information may be shared with other users, who are communicatively coupled to the network 102.

For sake of convenience and not by way of limitation, the following terminology may be used this patent document:

EDITED IMAGE/REMIX: An edited image, such as an edited image 132 that has been edited by a creator, may be referred to as a "remix" or "remix image." That is, to remix an image means to alter or enhance the image by applying one or more edits, filters, brushes, stickers, layovers, etc. to it. Similar to how a DJ can remix a song, a creator (e.g., a creator who uses PicsArt to edit an image) may take any content (including the creator's own content, other content that is public domain, content that has been contributed by others) and remix it into something different.

NETWORKED SERVICE: A networked service may be any service or group of services that facilitate use of or work in conjunction with one or more of the embodiments contemplated herein. For example, in one or more embodiments, the network service may be a service such as PicsArt, Inc. of San Francisco, California, which is a networked service that facilitates editing, collaging, drawing, and/or sharing of images and provides one or more applications that support these features/services-including, in one or more embodiments, an image editing application that facilitates editing, sharing, view others contents, and applying some or all of replay edits.

REPLAY: As aspect of embodiments of the present disclosure is the concept of edit "replay." Similar to a video replay, in which a person has the ability to rewind, stop, view, forward, etc. a video, aspects of the present disclosure allow users the same or similar functions for image edits done by others. However, "replay" feature embodiments as discussed herein also provide users with the ability to easily apply some or all of the edits in a replay to their own image or images. This feature, therefore, extends the idea of "remix" by easily allowing others to copy or leverage a third party's edits for different images. For example, a PicsArt user may use the replay feature to apply the edits, which were used by a third party to apply the third party's edits, to their own image, which itself may already have another replay edits applied to it. And, in one or more embodiments, users may also easily modify and/or supplement a set of replay edits. It shall be noted that the remixes and the associated replays capture the process of creation—the application of discrete editing steps—and make this discoverability (e.g., by using a networked service, search terms, hashtags, etc.) so that others can find and use them. It shall also be noted that, in one or more embodiments, a replay edit data (or a replay file) may refer to a file or files that includes the information that facilitates applying a sequence of editing steps, including identifying the tools and their associated parameters, that were used to create the final edited image.

FREE-TO-EDIT/FREE-TO-USE: As part of the network service's terms of service, or as indicated by a user, or otherwise, a user may upload content as "free to edit" or "free to use," which gives anyone else in the network service community (e.g., the PicsArt community) permission to use their content for their own edits. Likewise, to the extent the edits contain some intangible asset, in one or more embodiments, users who share or post replays grant permission for other users to use and/or modify replays.

2. CREATOR METHOD EMBODIMENTS

Figure 2:
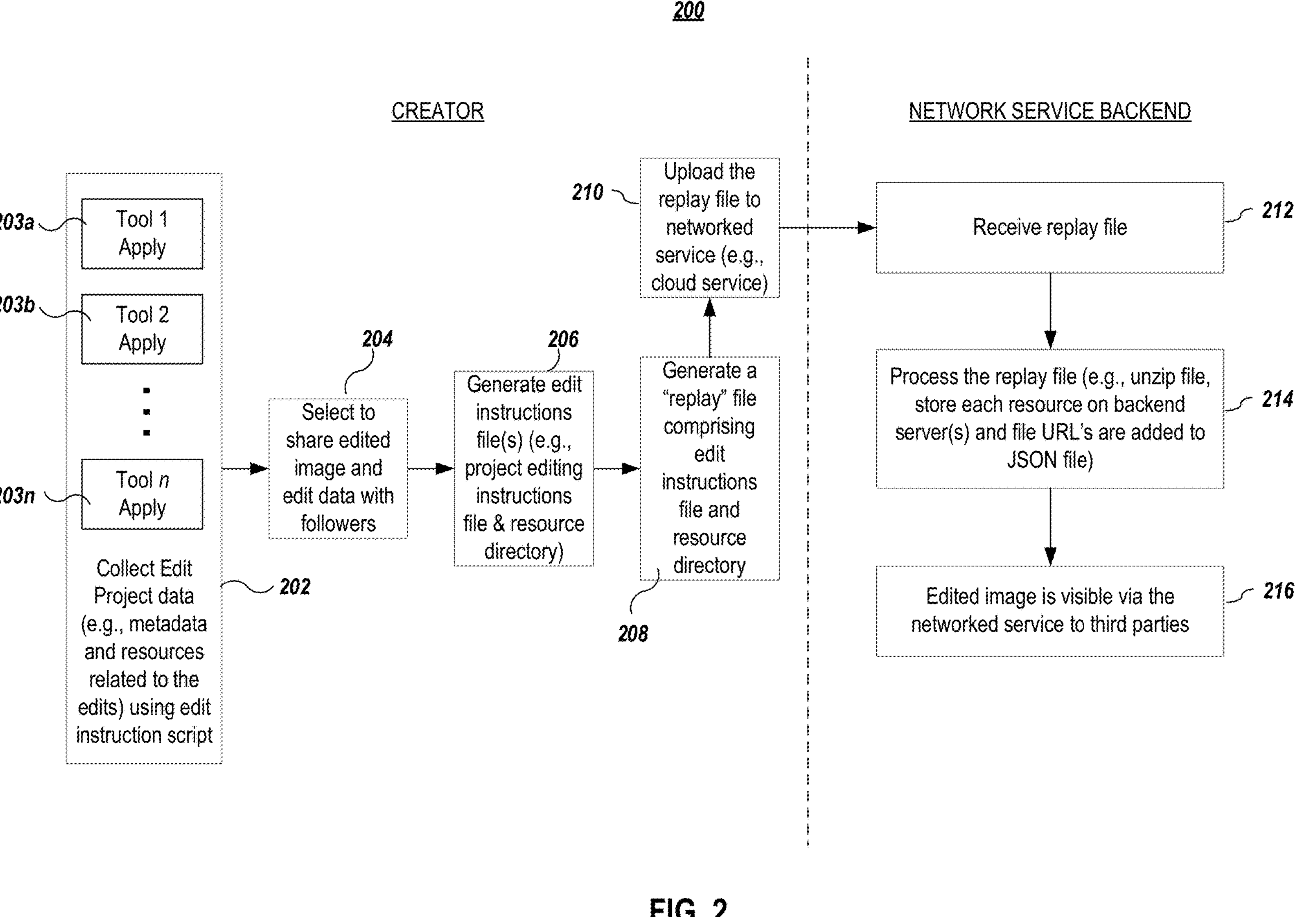
FIG. 2 depicts a flowchart of an illustrative process 200 for generating editing information, which may be shared with one or more other users, according to embodiments of the present disclosure.

FIG. 2 depicts a flowchart of an illustrative process 200 for generating editing information that may be shared with one or more other users, according to embodiments of the present disclosure. In one or more embodiments, users may participate in a network service that allows them to share information, such as images and replay edit data. An example is PicsArt, Inc. of San Francisco, California, which is a networked service that facilitates editing, collaging, drawing, and/or sharing of images and provides one or more applications that support these features/services—including, in one or more embodiments, an image editing application that facilitates editing, sharing, view others contents, and applying some or all of replay edits. In one or more embodiments, these features/services are accessible via one or more applications on a user's device. In one or more embodiments, the application(s) may include one or more graphic user interfaces that allow the users to interact with the user devices.

In one or more embodiments, a creator uses the application to edit an image and create an edited image of an original image (i.e., a remix image or final edited image). In one or more embodiments, the application may provide various tools for applying edits, such as editing tools, filters, brushes, stickers, cutouts, cropping, etc.

In one or more embodiments, the application may also include an edit instruction script or feature that collects (202) the edit information performed by the user via the editing application. In one or more embodiments, the edit instruction script may be a feature that a user may turn off or on; alternatively, the edit instruction script may be a feature that operates continually as a background process.

As illustrated in FIG. 2, a user may apply a series or sequence of edit using editing tools, e.g., Tool 1 203*a*-Tool n 203*n*, that are applied to the original image to generate a final edited image and are captured by the edit instruction script. In one or more embodiments, the edit instructions may be captured at the end of the editing process or may be captured when each edit tool is applied to the image being edited. For example, in one or more embodiments, each time the edited image creator completes an edit to alter the image via a tool, the user may select an "Apply" button in the application's interface and metadata and recourses may be collected by the edit instruction script so that the edit steps, including the parameters or settings used in each edit, and related resource information used by the tool are saved as result data (e.g., 203*a*, 203*b*, . . . 203*n*). In one or more embodiments, upon completing the entire edits, the result data from the edits (e.g., 203*a*-203*n*) may be compiled and stored as a project editing data (or replay edit data).

In one or more embodiments, the edit instructions script captures editing instructions corresponding to user edit actions/instructions and information regarding related resources. Edit instructions may comprise parameters specifying various information, such as which tool was used, which effect was applied, what specific levels/values were applied for the tool or effect, settings for applied colors, font, or styles, cropping size, etc.

In one or more embodiments, the edit instructions script also captures resource information. The resource information may include items as the original image and additional edit information such as background(s), frame(s), sticker(s), template(s), and other resources used during the editing process. In one or more embodiments, the resources may also include intermediate results, such as intermediate generated masks and other intermediate results. These intermediate results may be beneficial when "replaying" intermediate edits to another user.

As noted in FIG. 2, after creating an edited image, the user may want to share (204) their edited image via the networked service or another service. In one or more embodiments, the user may select a "Share" or "Post" button on the application to cause the final edited image to be posted to a social network site for the user and/or sent to a feed for followers of the user.

In one or more embodiments, the edit instructions may be processed (206) into a file or files. For example, in one or more embodiments, the project (or replay) editing data may be saved as a JavaScript Object Notation (JSON) file—although it shall be noted that other data formats may be used. In one or more embodiments, each of the result data 203*a*-203*n* may be compiled and saved as a JSON file when the user completes each edit using a tool; and, in one or more embodiments, those files may be combined into a single file, such as a single JSON file.

In one or more embodiments, the resources may be stored (206) in a resource directory. In one or more embodiment, the resource directory may store copies of the resources used in making the edited image. Alternatively, in one or more embodiments, instead of creating copies of these resources to be stored in the resource directory, a directory file may be generated that includes identifiers that identifies where the resources may be found.

In one or more embodiments, the edit instructions file and the resource directory may be processed (208) into a file, which may be referred to, for convenience, as a replay edit file or simply a replay file. For example, in one or more embodiments, the project editing metadata file (e.g., the JSON file) and resource directory may be combined into a single compressed file, such as a ZIP file—although it shall be noted that other data formats may be used. In one or more embodiments, the replay file may also include the original image, one or more intermediary edit images, the edited image, or a combination thereof. Alternatively, the edited image may be a separate file.

As illustrated in the embodiment depicted FIG. 2, the replay file may be uploaded (210) to the networked service so that it may be published and shared with other users.

In embodiments, the networked service receives the replay file (212) and processes (214) it. In one or more embodiments, processing the replay file may include uncompressing it if it is a compressed or zipped file. In embodiments, processing the replay file may also include processing the edit instructions file (e.g., the JSON file) and the resource directory so that the edit instruction data is combined with the resource directory. For example, during this processing stage, the resources are stored individually on the backend of the networked service (or are identified, if they already exist at the backend), and local resource paths in the resource directory are changed to global path identifiers (e.g., global Uniform Resource Identifiers (URIs) or Uniform Resource Locators (URLs)), which allows the information to be used with the edited image and replay. Because a large number of users may use the same or similar resources, to reduce the storage space, the network service may use pathways (e.g., pointers) to the resources in the resource directory instead of downloading the copies of resources.

At step 216, the edited image may be displayed on another user's feed. In one or more embodiments, the edited image may include an indicator that replay data is associated with the image and may be obtained by a third party to use on one or more of their images. In one or more embodiments, the edited image may appear as a thumbnail and the indicator of associated replay data may visible in the thumbnail view.

Figure 3A:
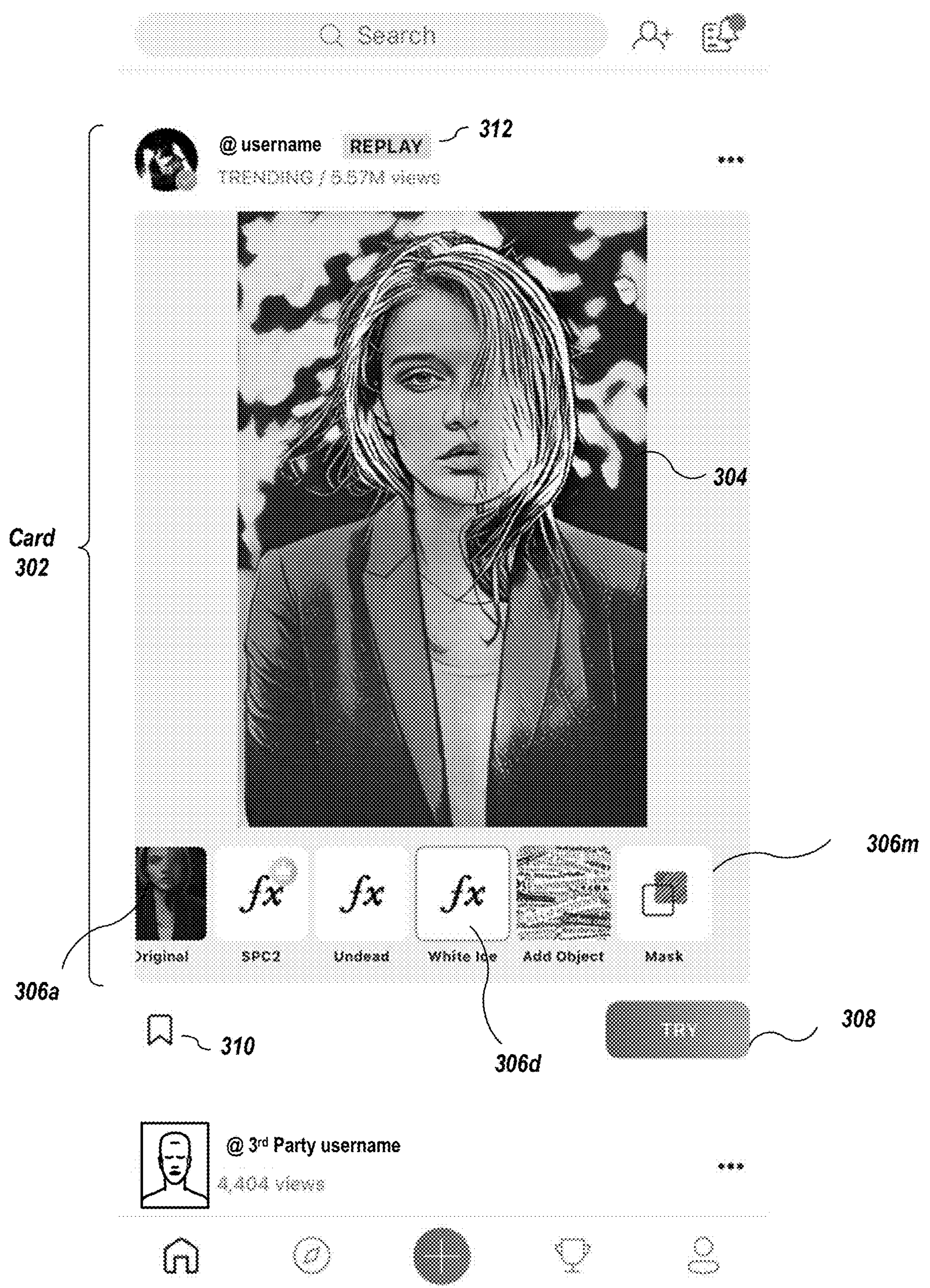
FIG. 3A shows an example edited image card with replay, according to embodiments of the present disclosure.

FIG. 3A shows an example remix/edited image card 300, according to embodiments of the present disclosure. As depicted, the user's feed may display a replay card 302 that includes an image display section 304; a first thumbnail 306*a* that shows the original image; and other thumbnails 306*b*-306*m* representing the sequence of editing tools/steps, where the thumbnails may correspond to the tools or steps that the creator used to edit the original image. In one or more embodiments, the name of each thumbnail may be shown in the thumbnail, such as crop tool, sticker, filter, add object, mask, so on.

In one or more embodiments, the image display section 304 may display the edited image, as shown in FIG. 3A. In one or more embodiments, the user may pause over remix image for a certain period of time, and then, the steps in the replay may auto-play images on the image display section 304 so that a user may observe the sequential changes to the image at each editing step to that point. Thus, in one or more embodiments, the replay edit file may include a sequence of images depicting a progression of the original image to the edited image as the sequence of edits are applied, which may be stepped through or played like a video. In one or more embodiments, during the auto-play, a thumbnail may be highlighted to indicate which step (tool) is being taken. Alternatively, or additionally, the user may pause over or select the edit card (e.g., 306*d*, 306*m*, etc.) and see that result of that specific edit.

In one or more embodiments, the card 300 may include a button (e.g., "Try") 308, which may be a call-to-action button. Upon tapping the button, the process of applying the edits used to create an edited image may be "replayed" onto the user's own image may begin.

Figure 3B:
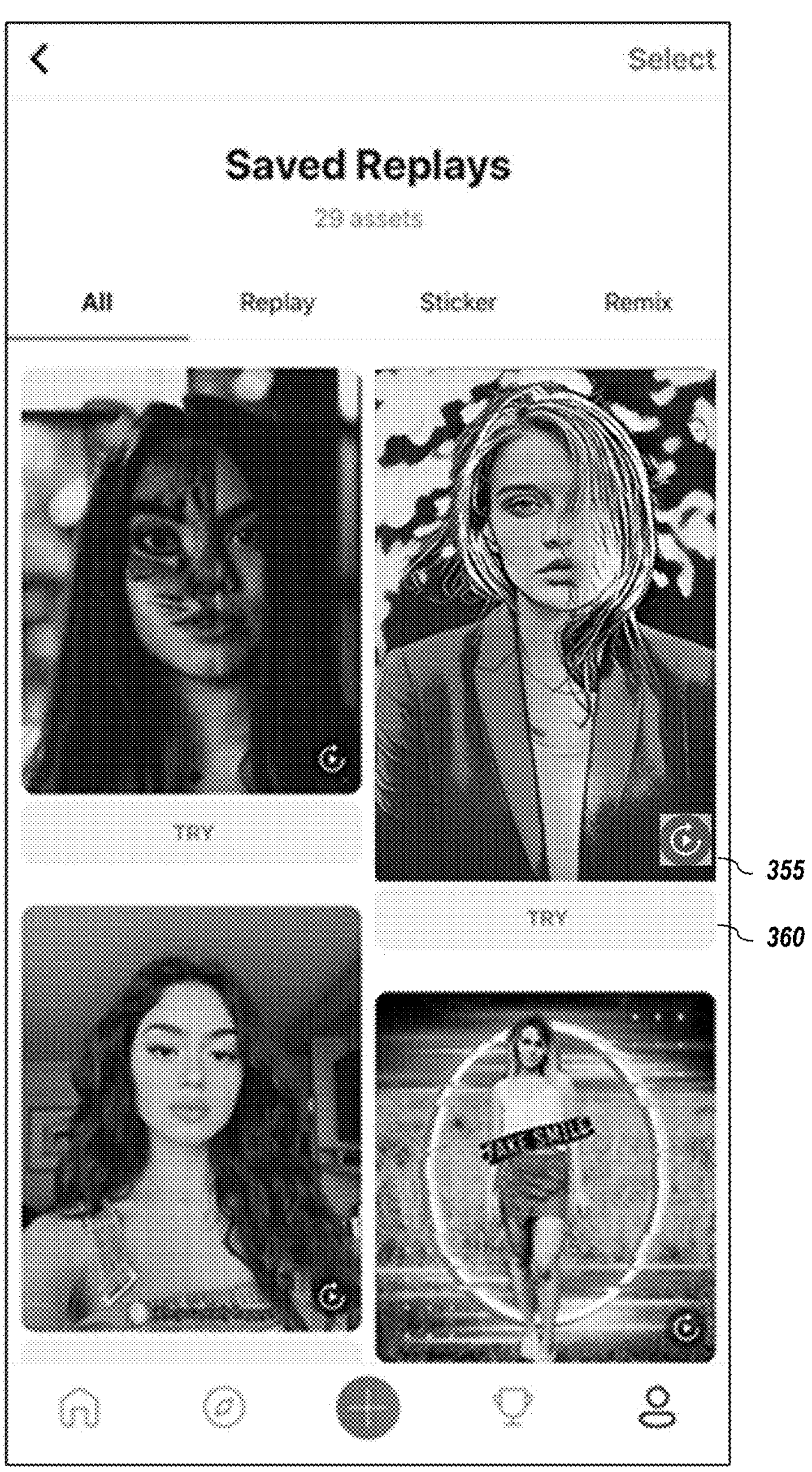
FIG. 3B shows an example replay collection view, according to embodiments of the present disclosure.

In one or more embodiments, the interface 300 may include a save or bookmark button 310 that allows the user to save this replay to a personal collection for future reference. FIG. 3B shows an example replay collection view 350 of saved replays, according to embodiments of the present disclosure. Note also that the edited final images in the view 350 include an indicator, e.g., replay indicator 355, that notes that there is an associated replay edit file. Also depicted is a button, e.g., Try button 360, that allows a user to select a saved replay for use on another image.

The presentation of the embodiment in FIGS. 3A & 3B and of embodiments elsewhere in the patent document are user-interface based. However, it shall be noted that embodiments may be implemented and/or presented in many different ways, including without limitation, different windows, tabs, next screen, etc.

3. REPLAY CONSUMER/USER EMBODIMENTS

Figure 4:
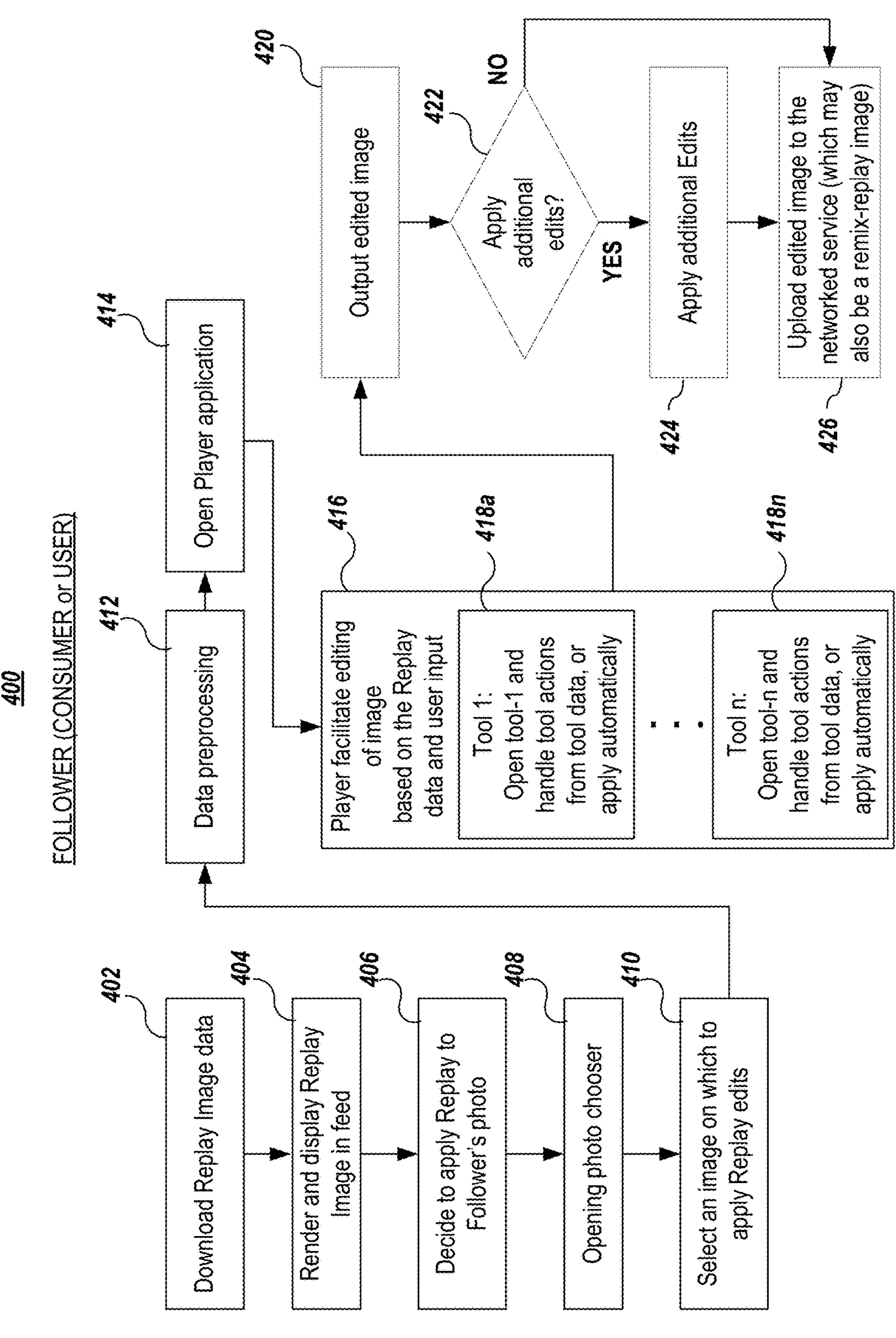
FIG. 4 depicts a flowchart of an illustrative process for editing an image using edit instructions shared via "replay" functionality, according to embodiments of the present disclosure.

FIG. 4 depicts a flowchart of an illustrative process for editing an image using edit instructions shared via "replay" functionality, according to embodiments of the present disclosure. In one or more embodiments, when a user/consumer opens the networked service application feed (e.g., PicsArt feed) on the user's device (e.g., 102*b* or 102*c* in FIG. 1), the replay image data is downloaded (402) from the networked service on the device. It shall be noted that the flow of data may be pushed to the device, pulled from the device, or both. In one or more embodiments, the replay file may include the sequence of edits-including tool settings/parameters and resources or pathways/pointers to the resources in the resource directory. The replay image is rendered and displayed (404) with the user's feed.

Figure 5:
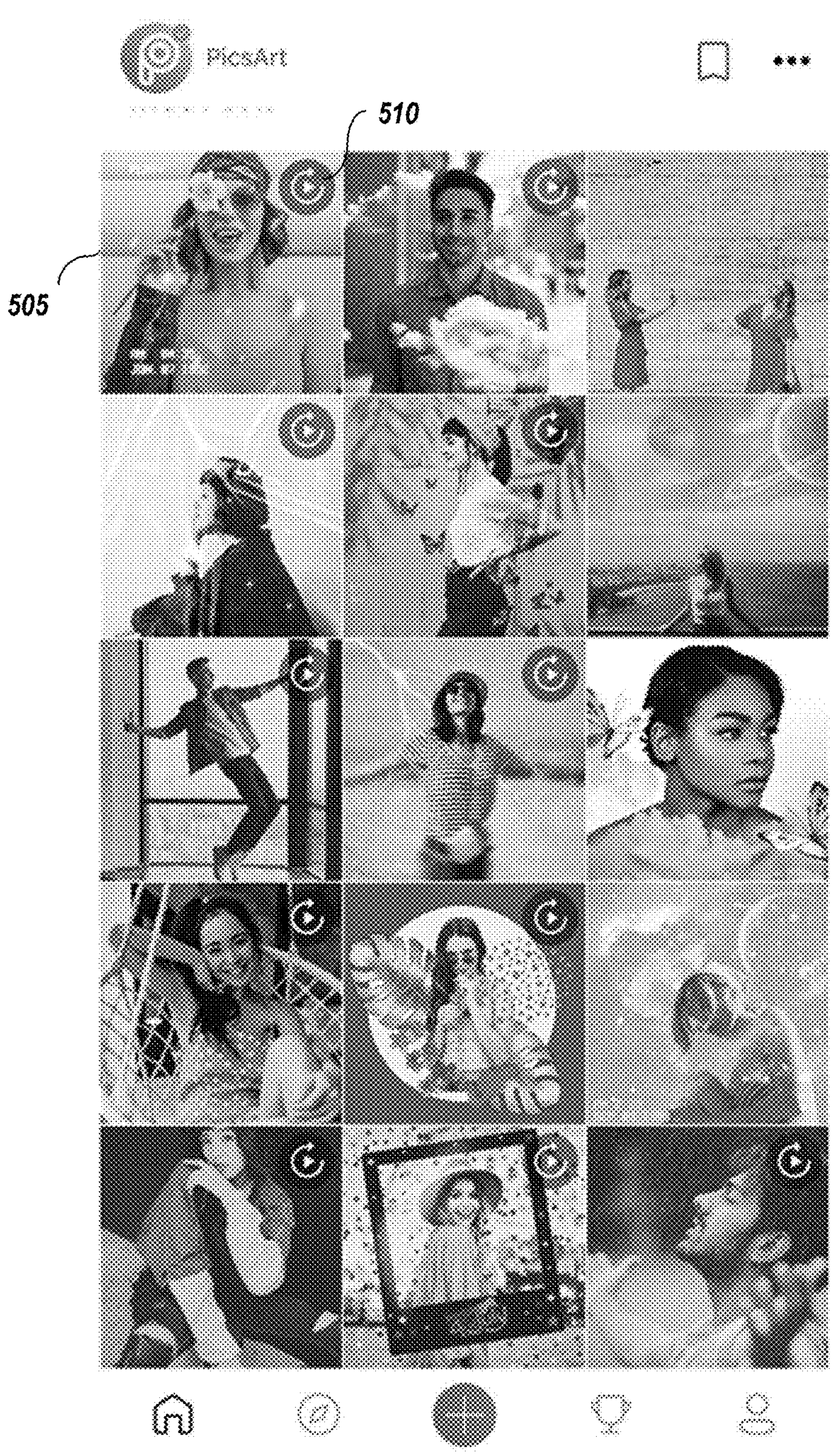
FIG. 5 shows a sample profile feed page of example images displayed on a user's device, according to embodiments of the present disclosure.

FIG. 5 shows a sample profile feed page 500 of exemplary images displayed on a user's device, according to embodiments of the present disclosure. As show, the feed 500 contains several images, which may be from different third parties. In the depicted embodiment, the feed contains at least one remix image 505, which is denoted by a replay indicator 510 to indicate that there is associated replay edit data for duplicating the edits. In one or more embodiments, a profile feed page may be one type of feed page; other types of feed pages may include pages comprising content from users that a user follows.

Figure 6:
FIG. 6 shows a partial view of a feed with a remix image and an indicator that shows that a user has selected the remix image from the feed, according to embodiments of the present disclosure.

In one or more embodiments, the user may select a final edited image with associated replay edit data to view it in more detail and/or to apply the edits to one of their images. FIG. 6 shows a partial view of the feed 600 with a final edited image 605 with replay edit data and an indicator 610 that shows that a user has selected that image from the feed, according to embodiments of the present disclosure.

Figure 7A:
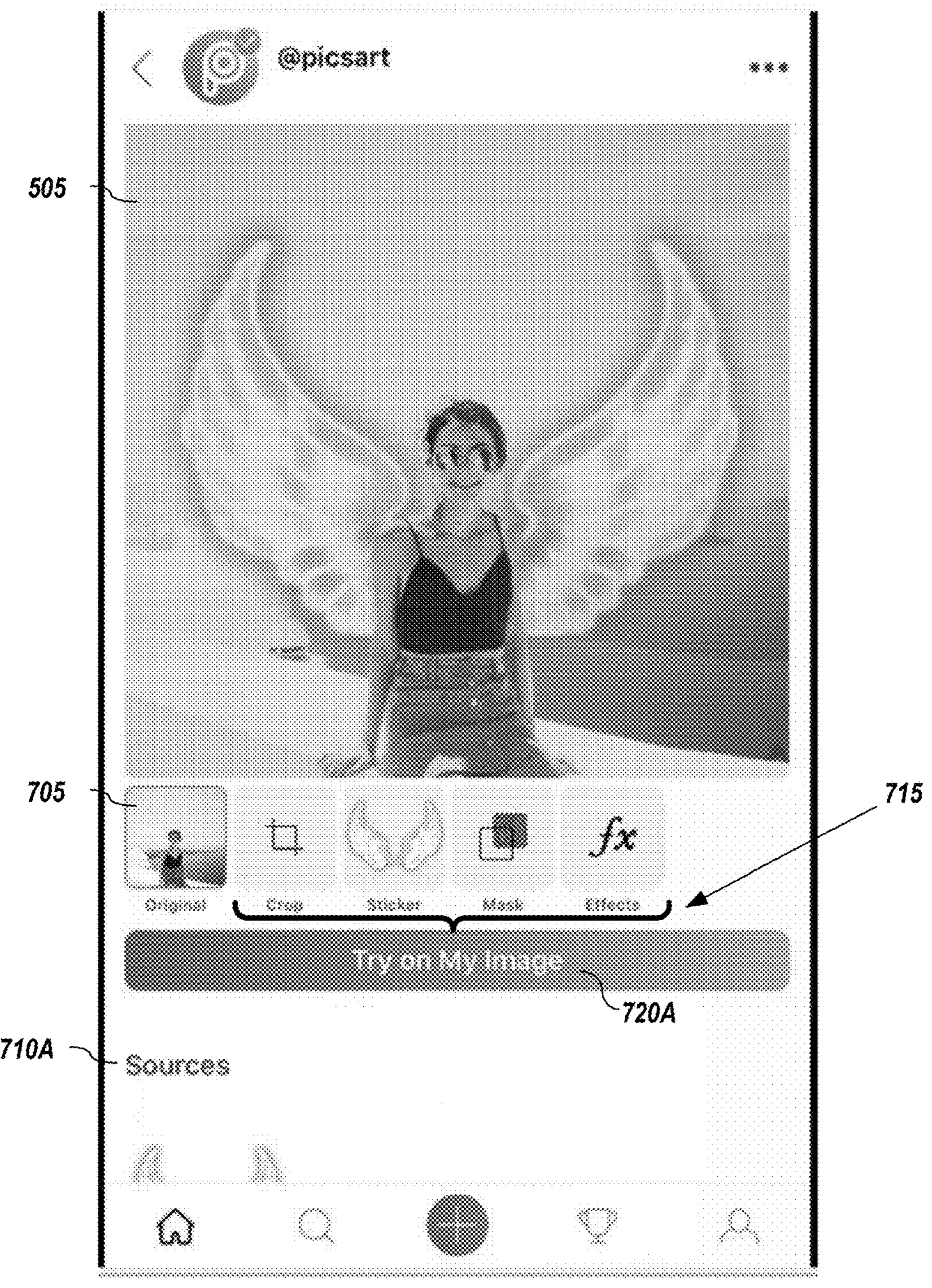
FIGS. 7A & B depict examples of replay cards or images, according to embodiments of the present disclosure.
Figure 7B:
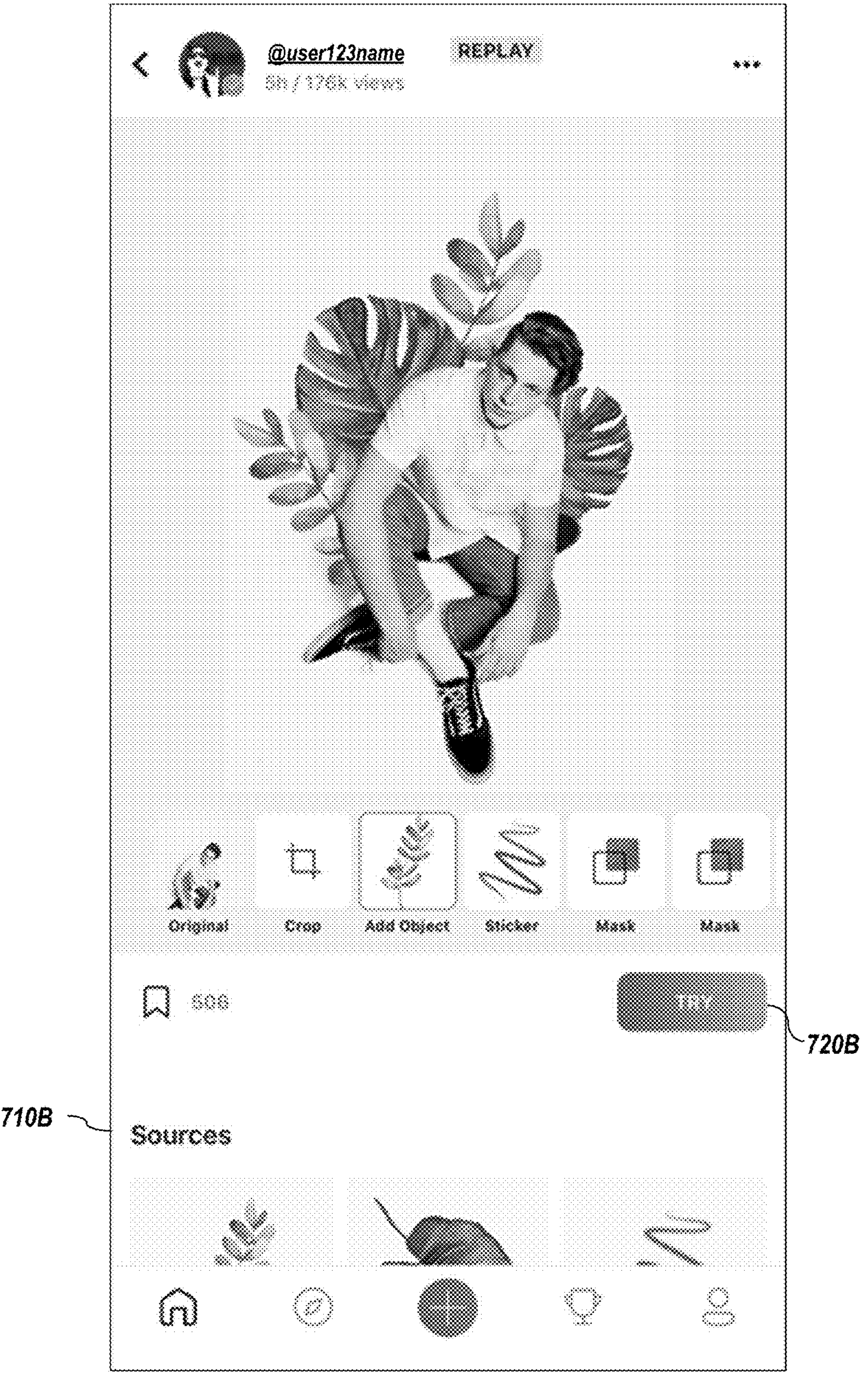

In one or more, selecting a remix-replay image from the feed cause the remix image and corresponding replay information to be displayed to the user. FIGS. 7A & 7B depict example replay card or images 700A & 700B, according to embodiments of the present disclosure. As illustrated in the depicted example 700A, the remix image card 700 includes an image display section 505 that displays the remix image, which may be in a larger format than when it appeared in one's feed screen. Also displayed in the depicted example is a thumbnail of the original image 705 of the final edited image 505 and a set of one or more edit cards or icons 715, which correspond to the editing steps that the original image 705 underwent to generate the final edited image 505. In one or more embodiments, each of the edit cards or icons may indicate whether the current user has access to that particular edit. For example, the networked service may provide different levels or features to different users based upon one or more factors, such as subscription level. For example, if a user does not have a sufficient subscription level for a particular edit, that edit card may be grayed out or otherwise indicate that the user cannot access that edit. In one or more embodiments, an indicator may indicate what action needs to be taken to unlock the particular edit (e.g., "Gold Subscription Required"). In one or more embodiments, by selecting the locked edit card, the user may be redirect to page that helps remedy the issue (e.g., open an account screen that allows the user to adjust their subscription level). In one or more embodiments, if an edit feature is no longer available, the edit card may indicate that the corresponding too is unavailable. In one or more embodiments, one or more substitute edit tools may be made available.

In one or more embodiments, the replay card 700A/B may also include a listing of sources or resources (e.g., sources 710A/B) used in the remix. For example, a carousel 710 show all stickers, images, or other assets depicted/used in the replay thumbnails 715. In the depicted example, carousel 710 shows the wings sticker used in the remix and also shown as a thumbnail in thumbnail 715. These wings are a sticker, or "source," according to product/user experience terminology, according to embodiments of the present disclosure.

Figure 8:
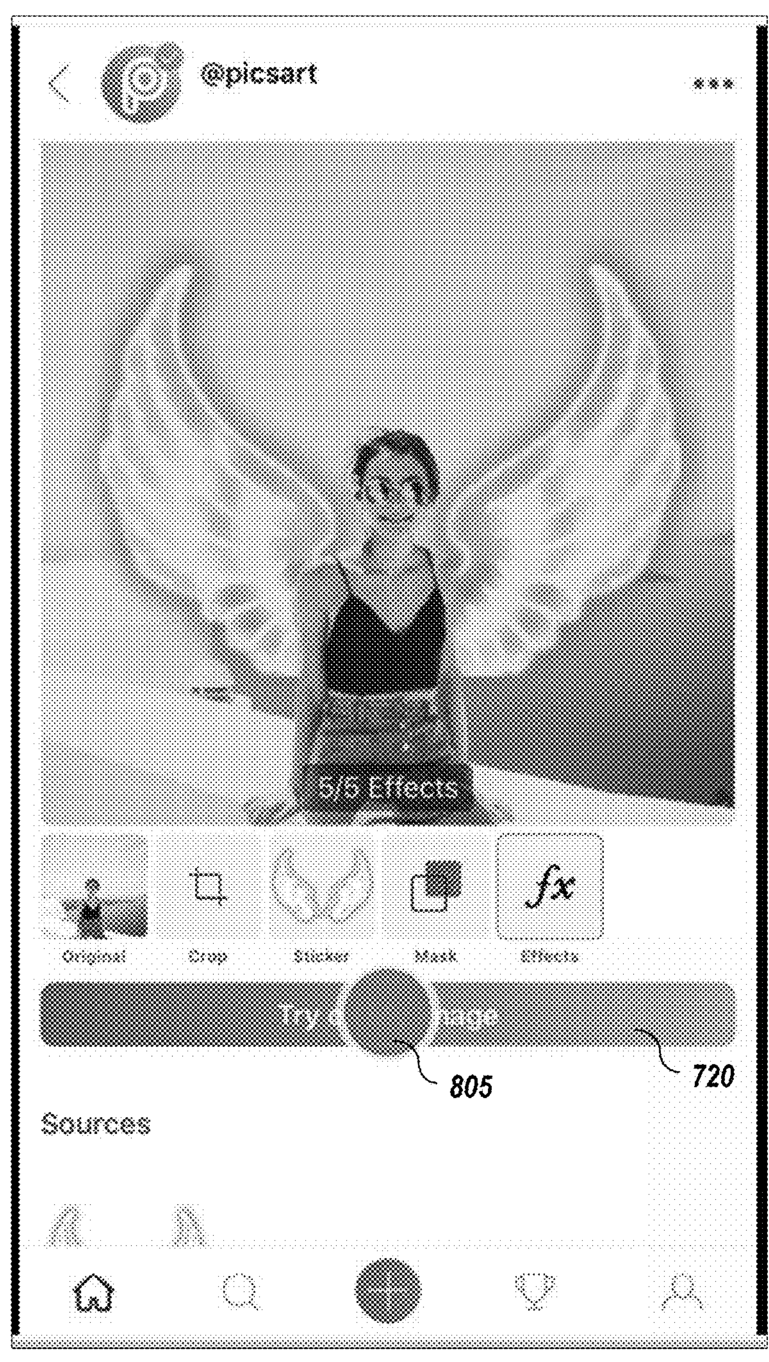
FIG. 8 depicts an example image in which the user has selected to apply the replay edits to their own image, according to embodiments of the present invention.

Finally, the depicted embodiment 700A also includes a selector or button (e.g., "Try on My Image" or "Try") 720A/B that is a call-to-action button to allow the user to apply the replay edits to an image of their choosing. FIG. 8 depicts an example image 800 in which the user has selected 805 to apply the replay edits to their own image by selecting the "Try on My Image" button 720, according to embodiments of the present invention.

Returning to FIG. 4, if the user decides (406) to apply the edits to an image (e.g., by selecting a button on the replay card), in one or more embodiments, the user device opens (408) a photo chooser that displays the user's images on the user device to allow the user to select an image onto which the replay edits may be applied.

Figure 9A:
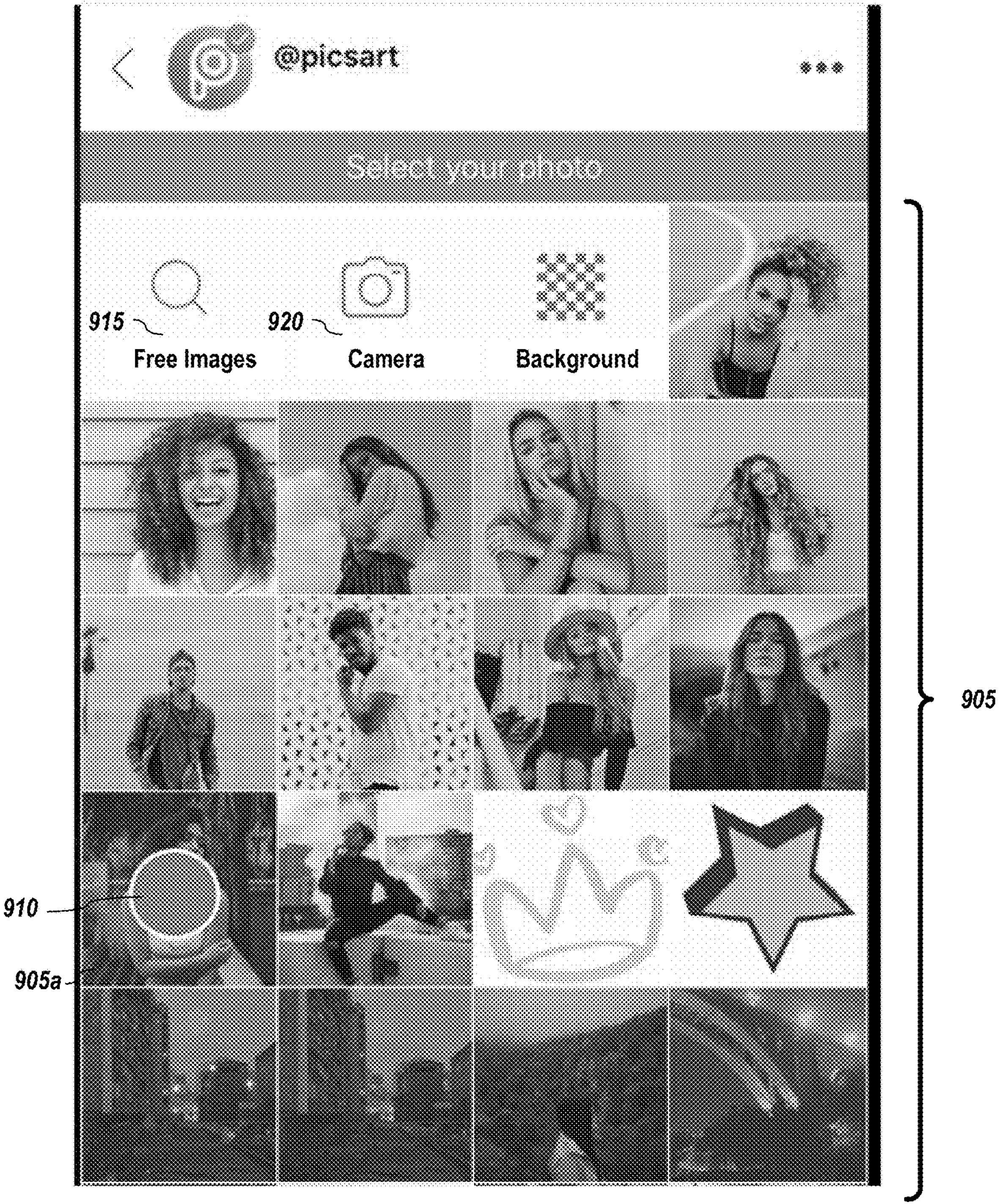
FIGS. 9A-C depict examples of photo chooser views, according to embodiments of the present disclosure.

FIG. 9A depicts a photo chooser screenshot 900A, according to embodiments of the present disclosure. As depicted, a photo chooser 900A displays thumbnails of the user's own images 905, which may be saved locally or in a cloud storage. In one or more embodiments, the photo chooser may also allow the user to find image 915 (such as accessing a datastore of public domain images) or access 920 the user device camera to take a new image and/or access the devices own photo library, if all images have not been incorporated into the application and available via viewer 905. In the depicted example, the user has selected (910) image 905*a*, which the user wishes to apply at least some of the replay edits from a replay.

Figure 9C:
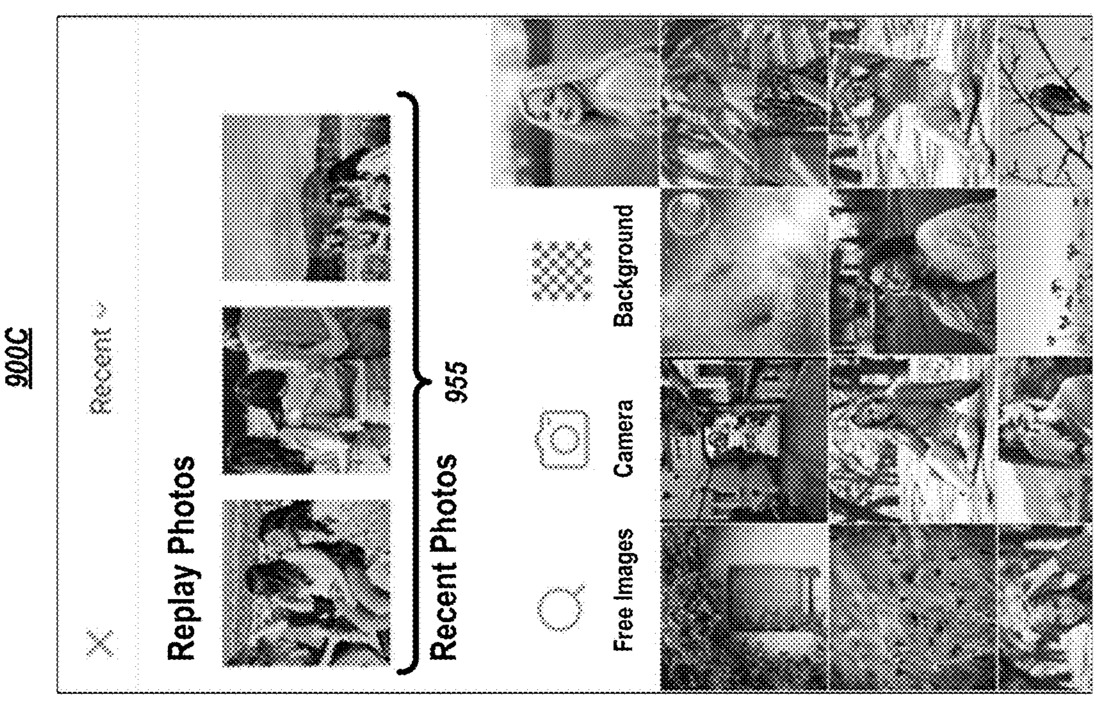
Figure 9B:
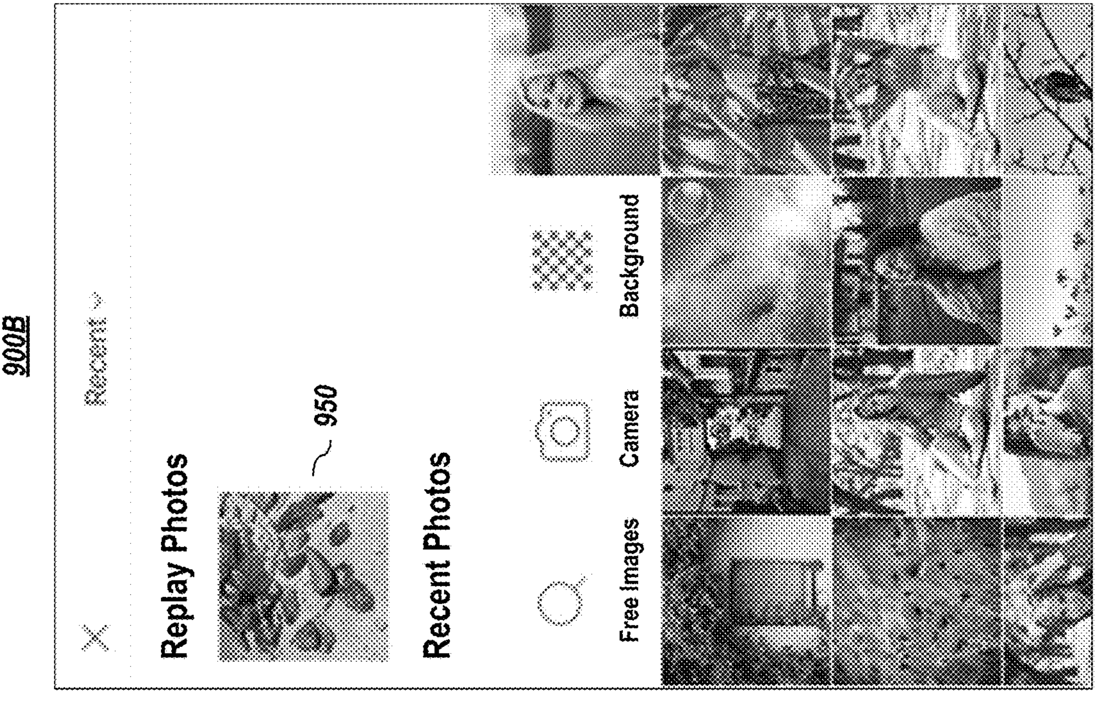

FIGS. 9B and 9C depict alternative photo chooser screenshot 900B and 900C, according to embodiments of the present disclosure. In one or more embodiments, the photo chooser 900B/C presents the added ability for the user to use an original image from a replay. In one or more embodiments, the replay or the replay edit data includes the original image used by the replay creator to when they originally made edits and uploaded the replay edit data. For example, FIG. 9B depicts a recent original image 950. As noted in FIG. 9C, if a user created a replay with a collage with multiple images, in photo chooser there will be all of the original images 955 used in that replay.

Returning to FIG. 4, in one or more embodiments, preprocessing may be performed (412), which may comprise adjusting one or more parameters of the replay JSON file for the newly selected image 905*a* or may comprises tool matching. For example, in embodiments, a manual brush edit tool used on the remix image may be adjusted to auto mode (portrait mode) to work on the new image. Concerning tool matching, an example of tool matching may be correlation of tools across versions. For example, if the replay JSON indicates that version 1.9 of a manual brush tool was used but in the version of the application being used by the user trying to apply the replay the manual brush tool is now version 2.0, preprocessing will ensure the brush tool step may still function.

Figure 10A:
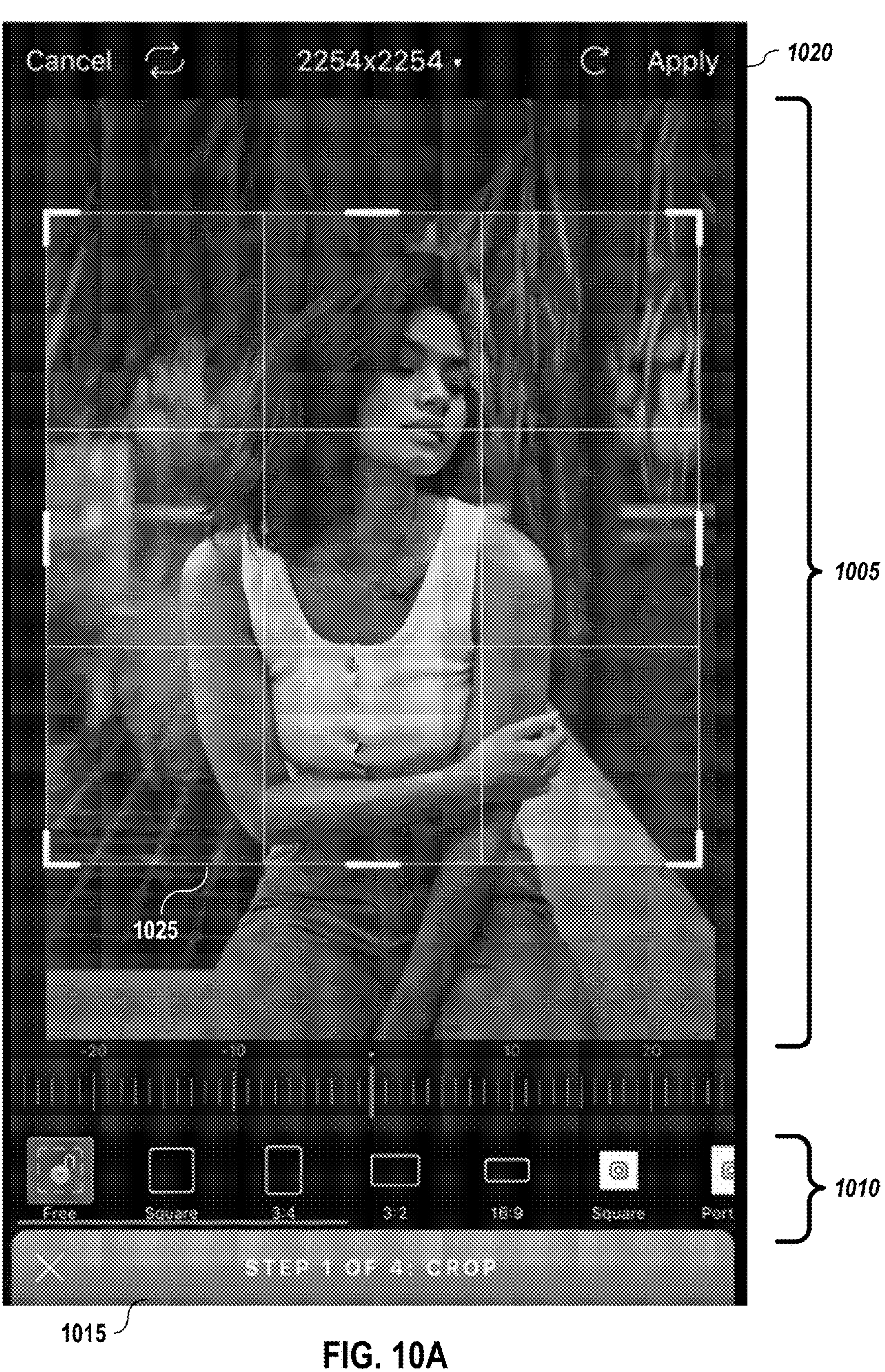
FIG. 10A depicts the selected image in the replay navigation application (or player), according to embodiments of the present disclosure.
Figure 10B:
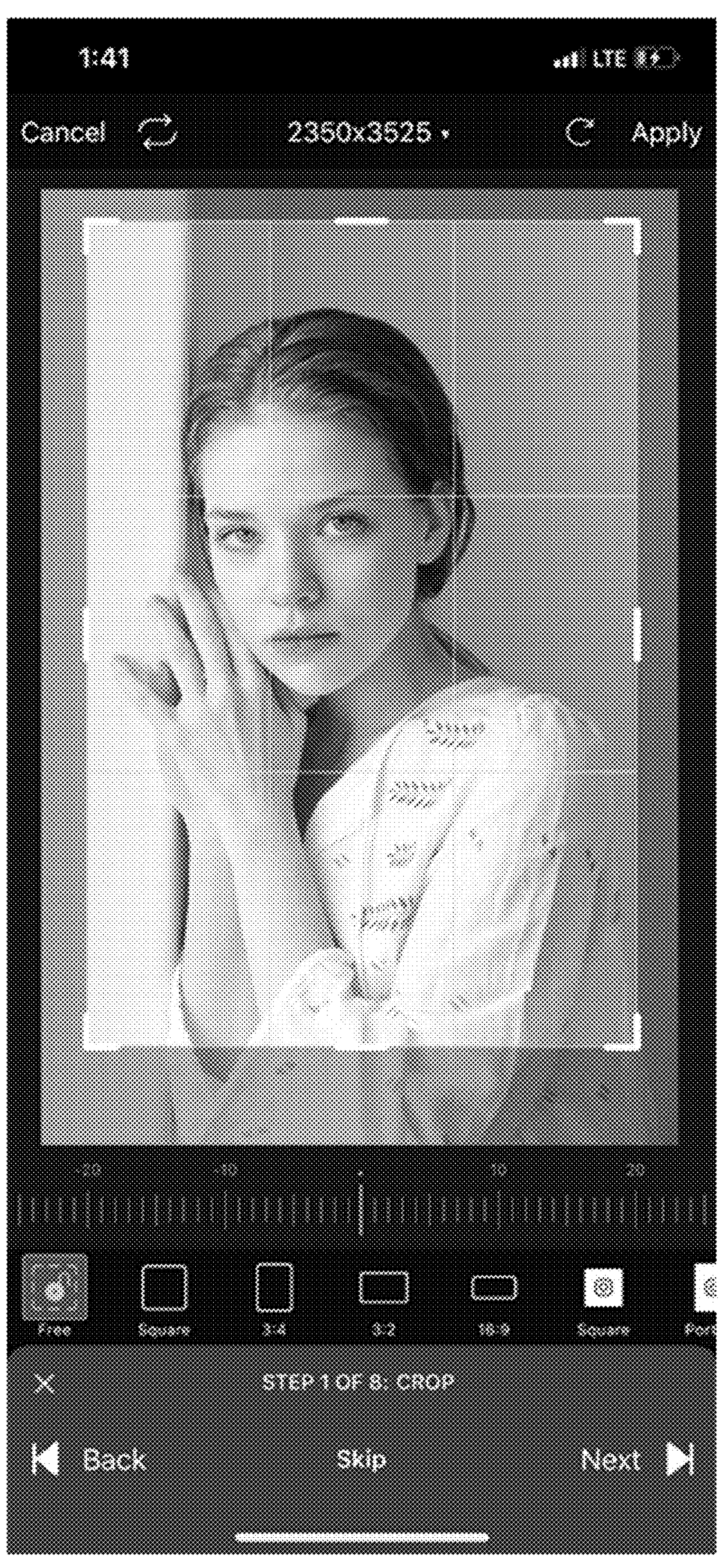
FIG. 10B depicts a selected image in an alternative replay navigation interface application (or player), according to embodiments of the present disclosure.

In one or more embodiments, a player application is opened or launched (414) that facilitates applying the replay edits to the newly selected image. FIGS. 10A & 10B depict selected images in a replay navigation interface application (or player), according to embodiments of the present disclosure.

As shown in the depicted example depicted in FIG. 10A, the display (or GUI) 1000 may include an image display section 1005. In one or more embodiments, the player application reads the replay file with the edit instructions and related resources and controls the edit tool opening sequence and actions. For example, in embodiments, the player reads the JSON and determines the exact crop size/position parameter so the user may simply accept and apply that or adjust which part/size/position of their image they wish to crop. As shown, the display has an indicator 1015 that indicates which edit tool is currently active (e.g., "Crop") and may indicate which step in the replay sequence it is (e.g., Step 1 of 4, in this example). In one or more embodiments, the player application allows the user to perform the editing step. For example, the user may crop a portion of an image by adjusting the size and location of a cropped portion 1025.

In one or more embodiments, the player may allow the user to skip or alter the edits, including altering one or more parameters (e.g., tools selection parameters 1010 and 1015).

FIG. 10B depicts an alternative replay navigation interface, according to embodiments of the present disclosure. As depicted in FIG. 10B, the replay player application interface may include the following:

Back button—which allows the user to go back to a previous step (in one or more embodiments, selecting "Back" undoes the applied changes of that step to the image);

Next button—which allows the user to go to the next step (in one or more embodiments, selecting "Next" applies the changes of that step (which may include modifications to the default changes) to the image). In one or more embodiments, if there are no more steps, the player the editor home screen will be opened.

Skip button—selecting this button causes the current editing step to be skipped and changes will not be applied. In one or more embodiments, the player may automatically advance to the next step, if any.

Once done with this current step of the replay sequence, the user may advance to the next step by indicating that they have finished with the current step (e.g., by selecting an "Apply" button 1020).

Figure 11:
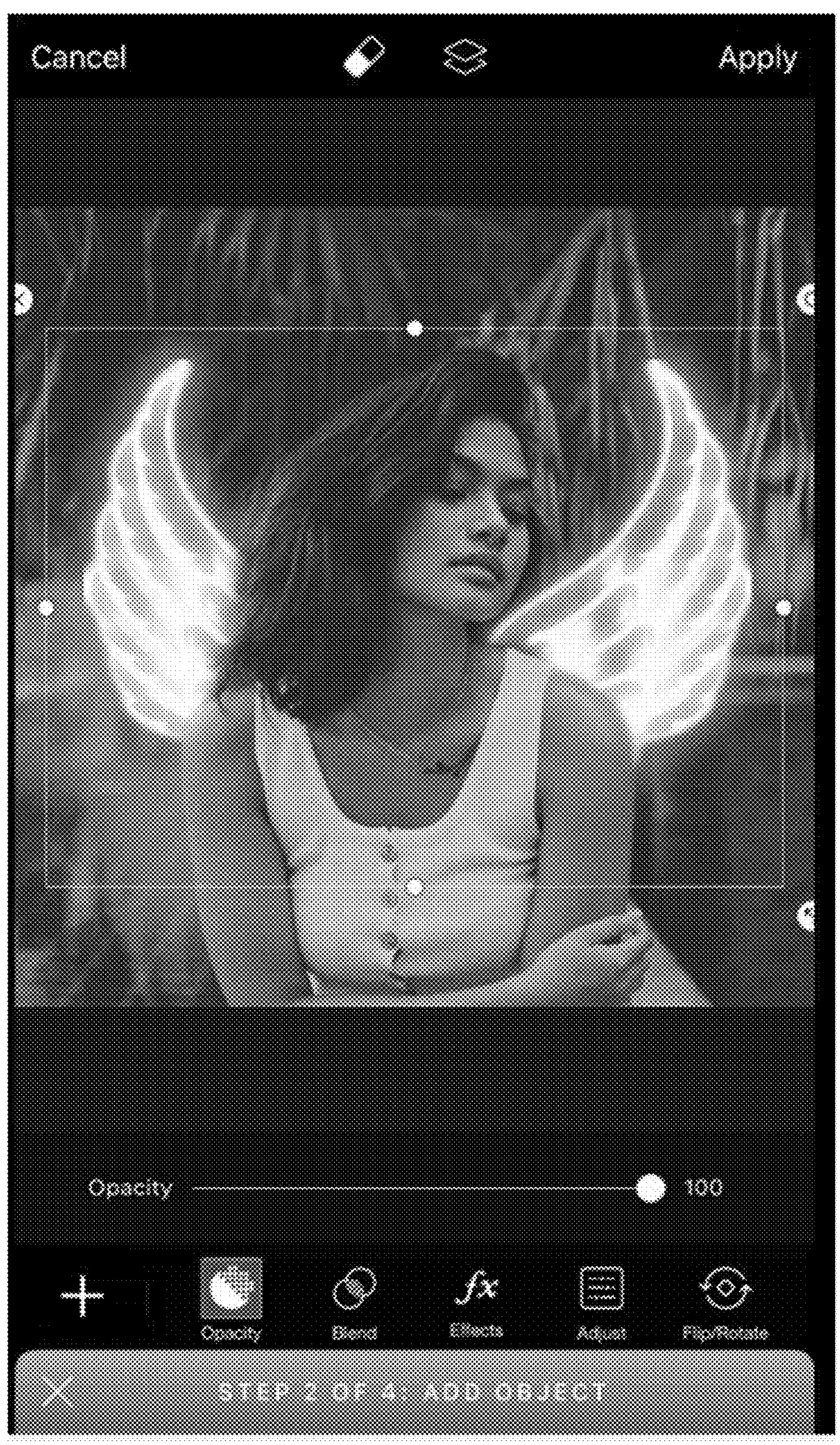
FIG. 11 depicts the player with the second of four edit steps for a replay sequence having been applied, according to embodiments of the present disclosure.

FIG. 11 depicts a replay navigation interface display with the second of four edit steps for a replay sequence having been applied, according to embodiments of the present disclosure. As shown in FIG. 11, an edit step may include adding a resource item to the image, in this case a pair of wings. In one or more embodiments, within each editing step, a wider scale of possibilities may be offered. For example, in embodiments, a user may remove the wings sticker and completely change this step by adding one or more other stickers.

Figure 12:
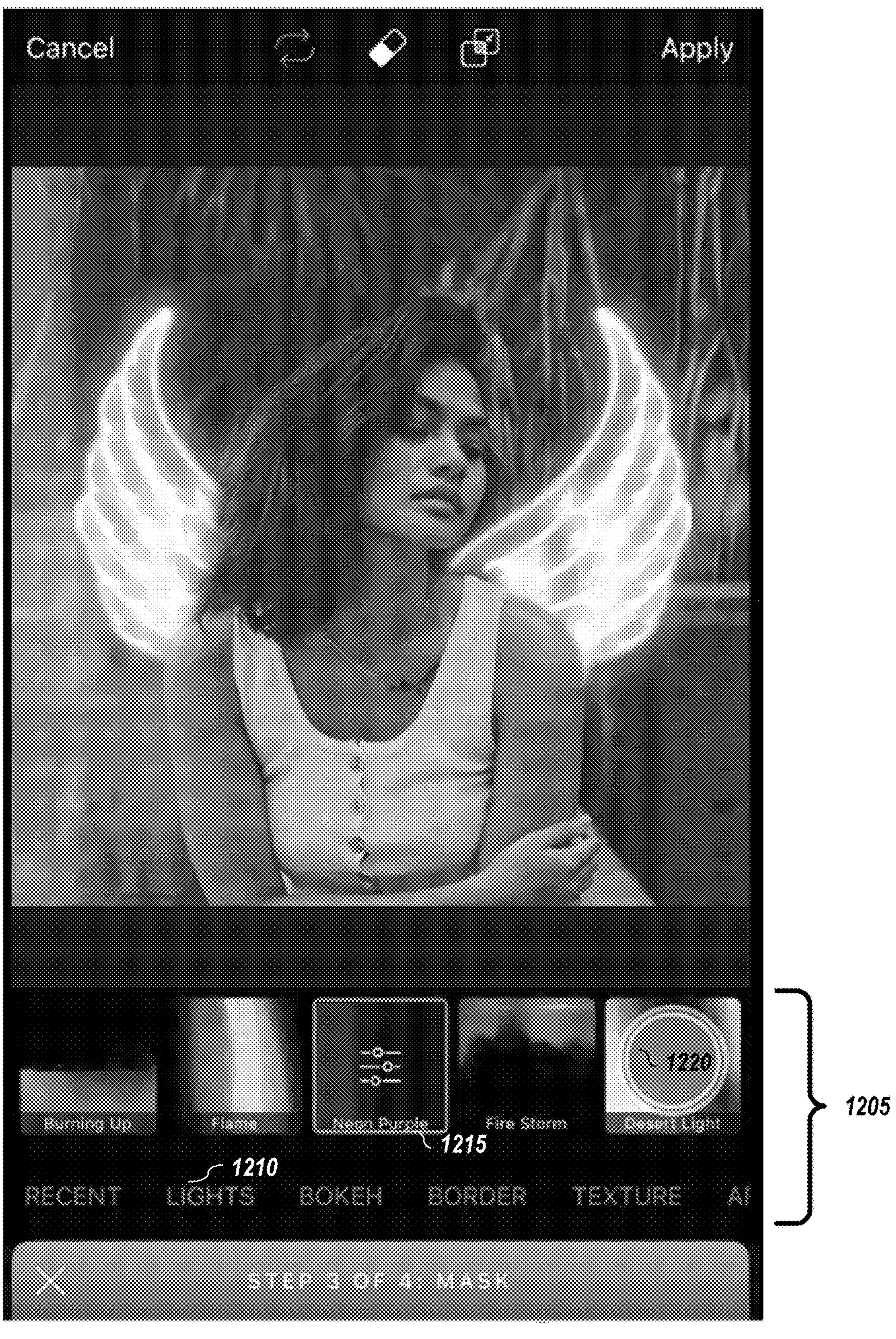
FIGS. 12 and 13 depict the player at the third of four edit steps for a replay sequence, according to embodiments of the present disclosure.
Figure 13:
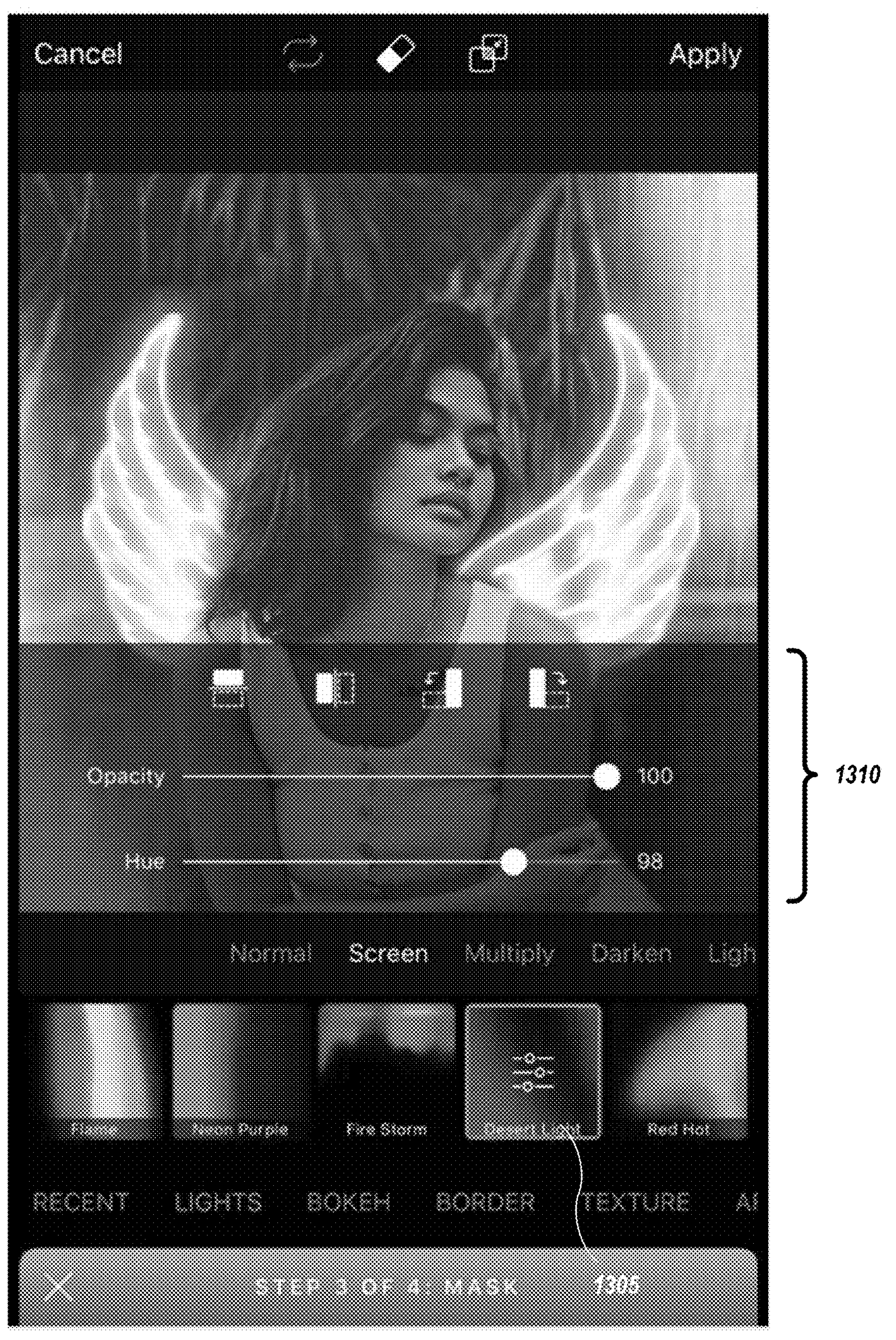

FIGS. 12 and 13 depict the replay navigation interface at the third of four edit steps for a replay sequence of edits, according to embodiments of the present disclosure. As shown in FIG. 12, the edit step may default to the particular tool and parameter settings used in the remix image, but the replay navigation interface may display all the tool feature and parameter options 1205 for the edit step. For example, the default mask may be "Lights" 1210 with "Neon Purple" 1215 color settings. However, as illustrated in FIG. 12, the user may select 1220 a different color setting (e.g., "Desert Lights" 1220). As shown in FIG. 13, this selection may prompt the display of additional parameters 1310 that the user may select/adjust.

Figure 14:
FIG. 14 depicts the player display of the final edit step for the replay sequence, according to embodiments of the present disclosure.

FIG. 14 depicts the player display of the final edit step for the replay sequence, according to embodiments of the present disclosure.

Figure 15:
FIG. 15 depicts the final image after all of the replay edit steps have been applied to the image, according to embodiments of the present disclosure.

FIG. 15 depicts the final image after all the replay edit steps have been applied to the image, according to embodiments of the present disclosure. In one or more embodiments, when the last edit tool has been applied, an editor displays (420) the resulting image 1505. For example, when the user completes adjustments on the image using the player, the user may exit the player and open an editor for editing the image. Unlike the replay navigator, the editor may allow the user to perform their own editing steps and create a new replay that includes the information of the edits as well as the steps that were performed by the player. Thus, in one or more embodiments, one or more additional edits 1510 may be added (422) by the user using (424) the editor. The original edit instructions along with any additional edits may be captured by an edit instruction script in like manner as described above. In any event, in one or more embodiments, this new final edited image 1505 may similarly be shared (426) along with its replay file. As noted previously, the shared replay information may be set to be free-to-edit and free-to-use by others.

It shall be noted that the edit tools may be applied sequentially or may be applied in different orders. For example, in one or more embodiments, a user may navigate interchangeably between the player (which facilitates execution of a replay edit step or steps—e.g., FIGS. 10-14) and the editor (which facilitates any type of edits—e.g., FIG. 15). In one or more embodiments, user may progress forward through the editing steps but may also scroll back to prior editing steps and redo one or more of those steps. In one or more embodiments, the replay edits may be automatically applied at the same time (for example, by provide a single one button apply interface), but a user may navigate to any specific edit tool to make any desired adjustments, including skipping or removing a particular edit or edits. In an alternative embodiment in which all the replay edits are automatically applied, a sequence of the images may be displayed on the image display section as a video while the player applies the steps in the replay sequentially. In one or more embodiments, the video of the replay may be separately shared via one or more networked services. For example, the video may be shared on as an Instagram story.

Figure 16B:
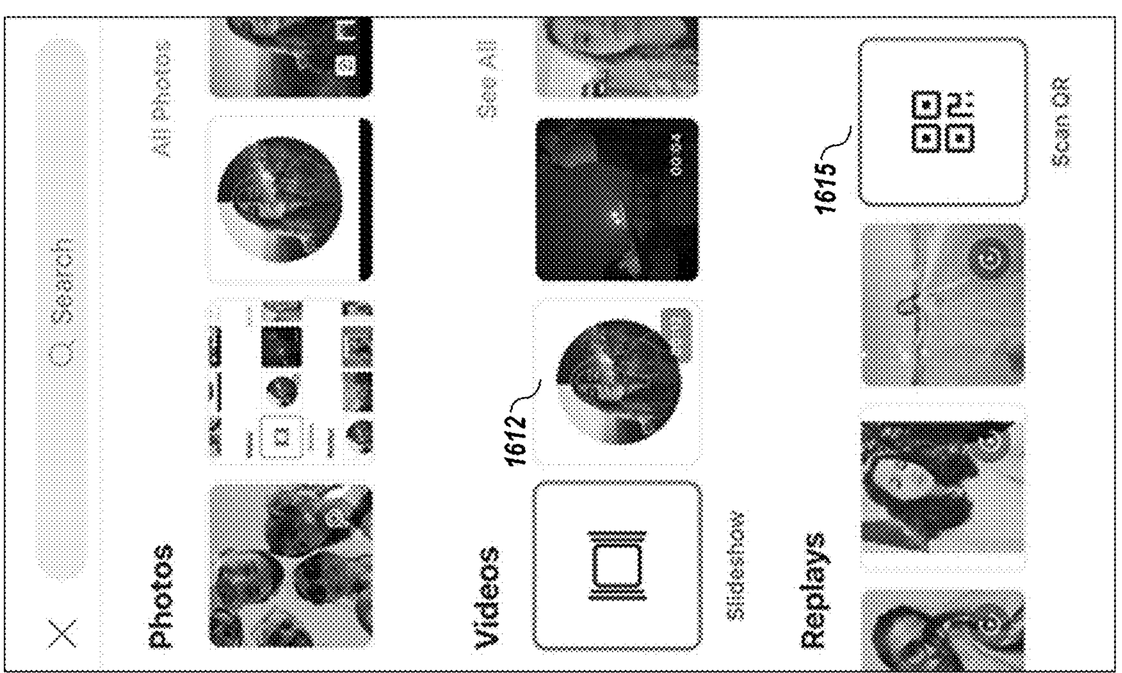
FIG. 16B depicts a carousel-style content display, according to embodiment of the present disclosure.
Figure 16B:
Figure 16A:
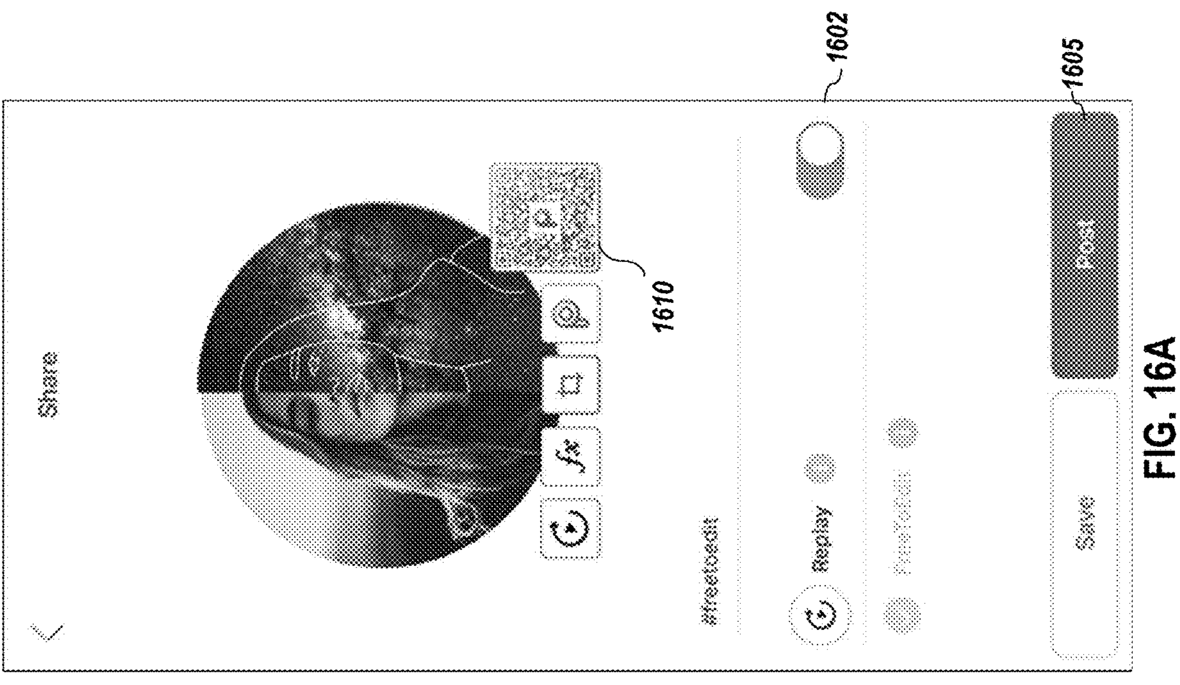
FIG. 16A depicts an example interface that facilitates sharing, according to embodiment of the present disclosure.
Figure 16D:
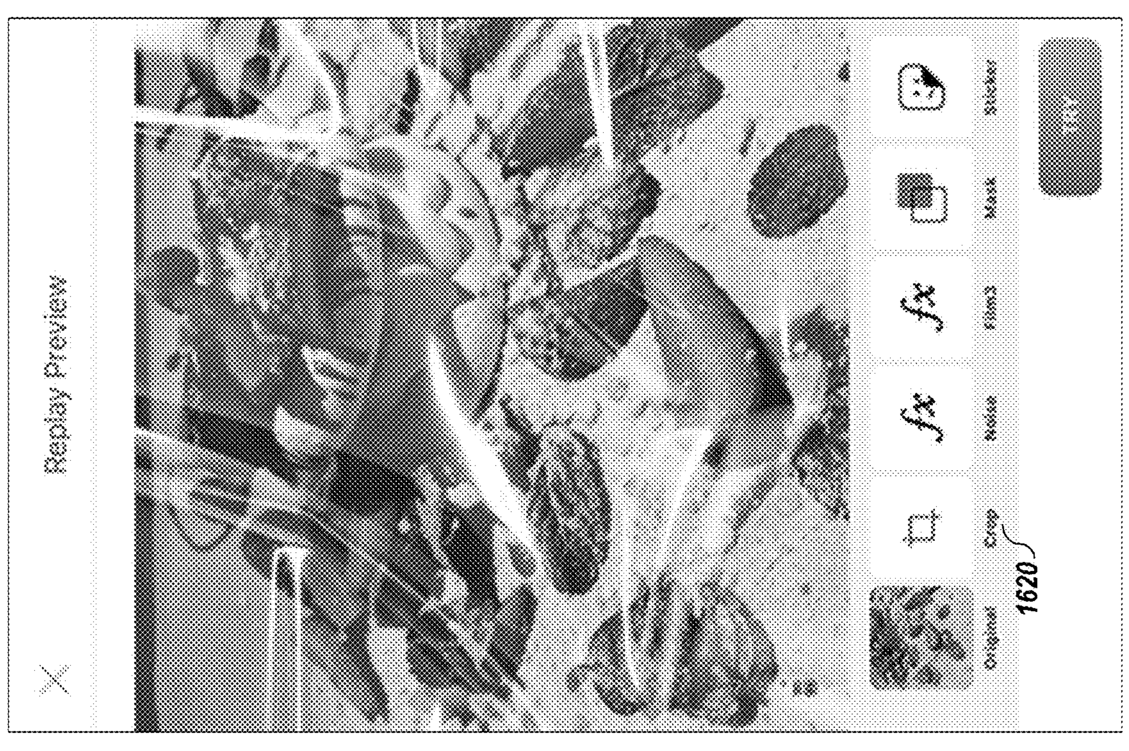
FIG. 16D depicts an example replay preview screenshot, according to embodiments of the present disclosure.
Figure 16C:
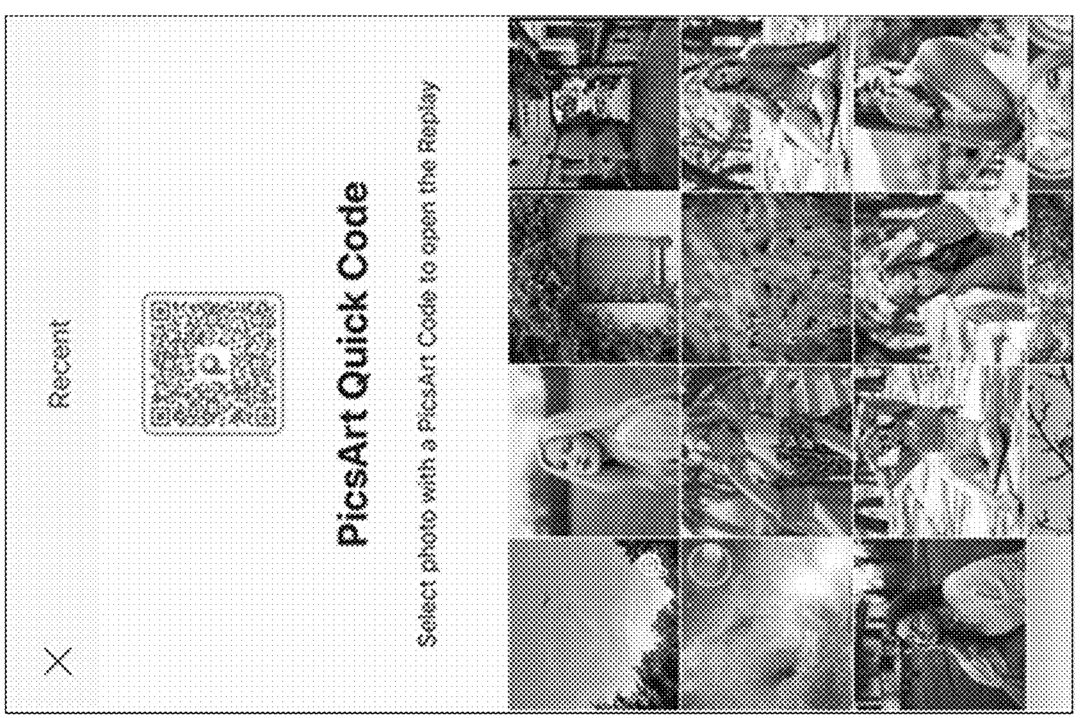
FIG. 16C depicts an interface that allows a user to select a screenshot of an image containing a QR code to find a replay, according to embodiments of the present disclosure.
Figure 17D:
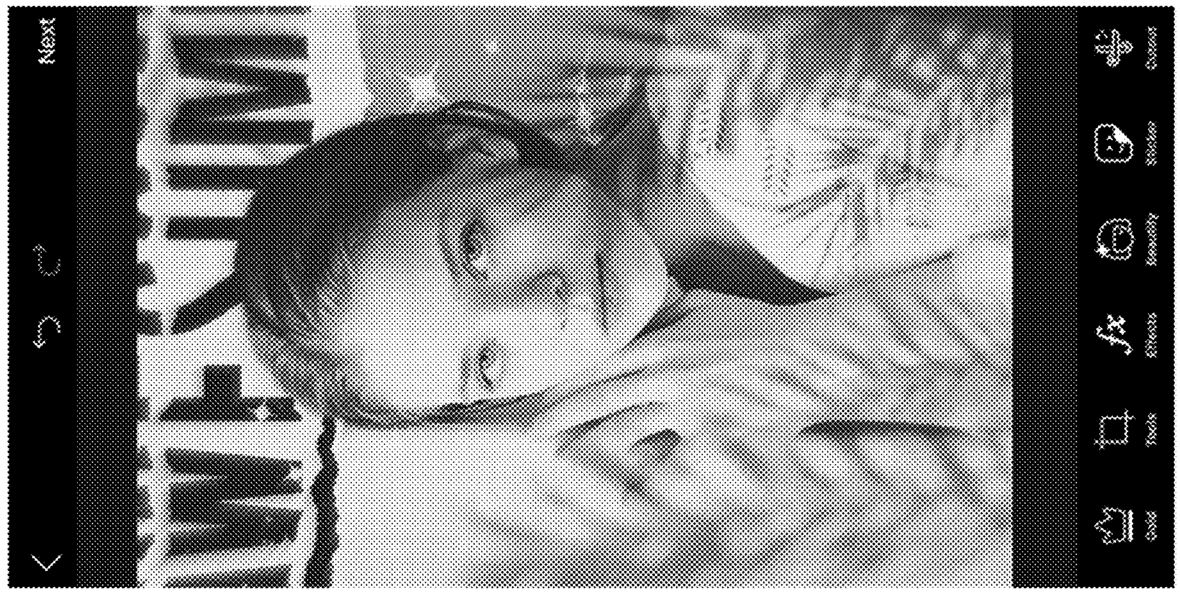
Figure 17C:

FIG. 16A depicts an example interface that facilitates sharing, according to embodiment of the present disclosure. As depicted, a user may export or save a replay to their device with video format, may post the replay or the replay in a video format 1650. In one or more embodiments, a link, such as a QR (Quick Response) code 1610, may be associated with the post that will allow people to access the replay edit data for their use. In one or more embodiments, a user may the QR code via in-app native QR scanners, a third-party app, or QR scanner that is part of the image editing application (e.g., PicsArt app). If a user has a screenshot of the QR code in their photo library (e.g., such as the last saved image in the library), when the application opens, a pop up with suggested automatically scanned replay may open. In one or more embodiments, when a user opens the application, a set of the last images (e.g., the last 10 images) may be scanned and if one of them contains a QR code, the application displays the searched replay in a replay carousel or listing in a display screen of the application. FIG. 16B depicts a carousel-style content display, according to embodiment of the present disclosure. Note that the replay video 1612 with a QR code in FIG. 16A is depicted in the replay video carousel as a result of the QR scan. Also depicted in the interface in FIG. 16B, users may also access a QR scanner 1615 via the application interface; in the depicted example, the QR scanner is placed at the last position of the replay carousel. In one or more embodiments, users may also scan a QR code using a camera. As depicted in FIG. 16C, a user may also select the screenshot of the image containing a QR code to find a replay. When a user clicks on an image that contains a QR code, in one or more embodiments, a replay preview is opened containing the replay the user searched for. An example replay preview is depicted in FIG. 16D. In one or more embodiments, the individual changes to the image may be viewed when the user selects or lingers over a tool (e.g., crop toll 1620).

FIGS. 17A-D depict the replay navigation interface of some edit steps for a replay sequence of edits for the image depicted in FIG. 10B with an alternative replay navigator interface, according to embodiments of the present disclosure.

4. ALTERNATIVE METHOD EMBODIMENTS

Figure 18:
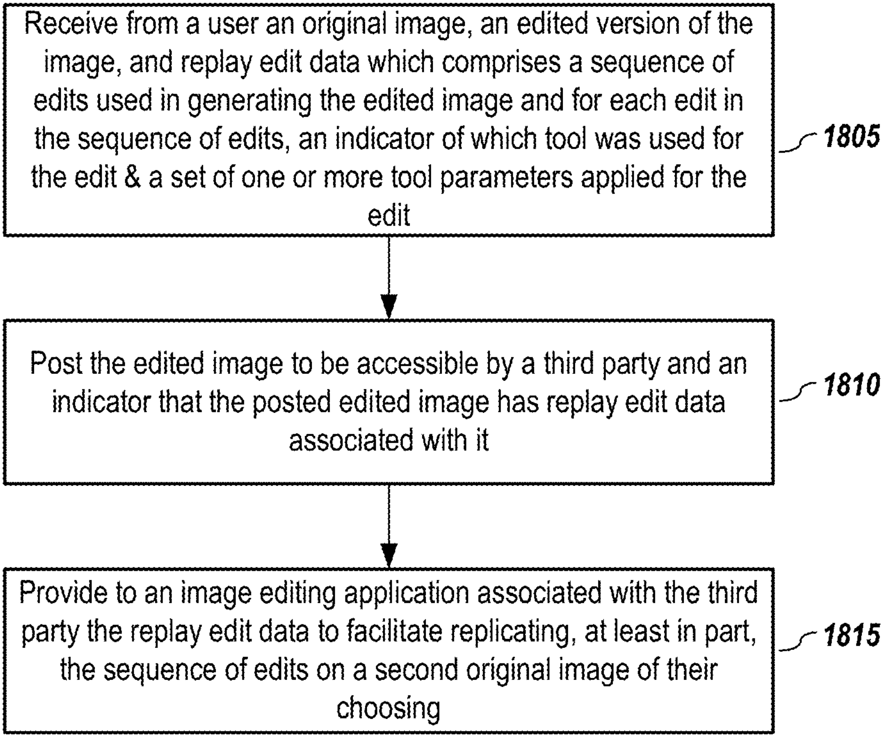
FIG. 18 depicts a method for a networked service to facilitate the sharing of replay edits, according to embodiments of the present disclosure.

FIG. 18 depicts a method for a networked service to facilitate the sharing of replay edits, according to embodiments of the present disclosure. In one or more embodiments, the service, such as PicsArt, receives (1805) from a user an original image, an edited version of the image, and replay edit data. In one or more embodiments, the replay edit file comprises a sequence of edits used in generating the edited image and for each edit in the sequence of edits, an indicator of which tool was used for the edit and a set of one or more tool parameters applied for the edit. As noted previously, the parameters may include resources used in generating the tool edit. In one or more embodiments, the network service may also provide the image editing application that the user used to generate the edits and data, to upload the data, to view shared data (such as others image data and replay edit files), and to apply replay edit data to their images.

In one or more embodiments, the networked service posts (1810) the edited image to be accessible by a third party and an indicator that the posted edited image has replay edit data associated with it. The posting may include pushing the data to users' image edit (and sharing) applications or sending the data as part of requests for data or content updates, such as feeds, from the users via the application. It shall be noted that the application may be a mobile application, a standalone computer application, or may access or implemented via a web browser. In any event, in one or more embodiments, a third party is provided (1815) the replay edit data to facilitate that third party user the ability to replicate, at least in part, the sequence of edits on a second original image of their choosing.

Figure 19:
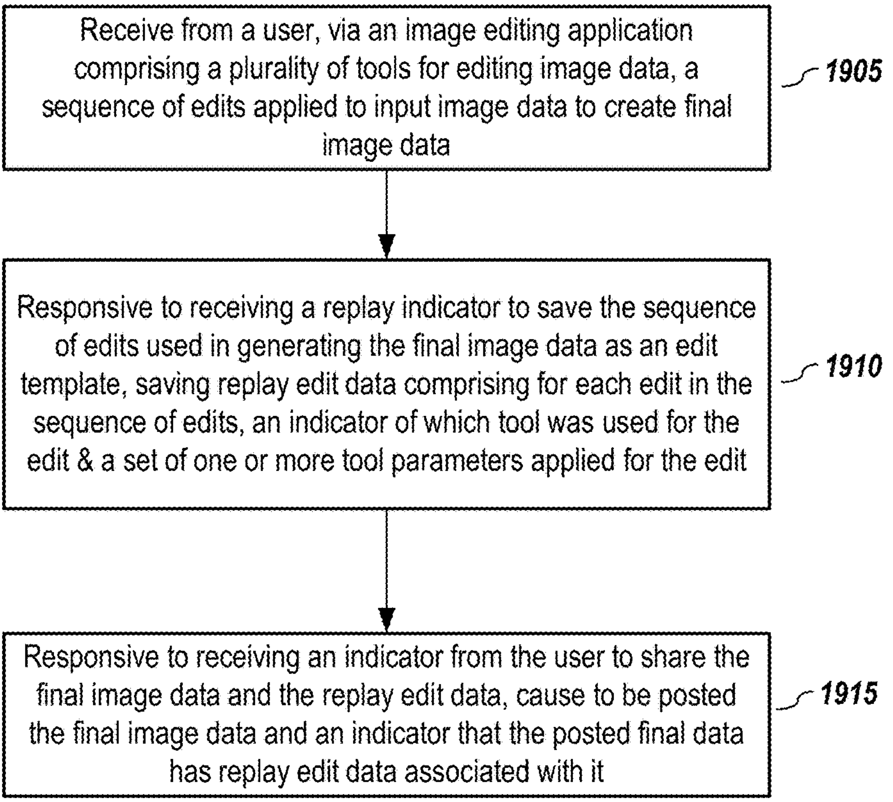
FIG. 19 depicts a method for an application to capture replay edits for sharing, according to embodiments of the present disclosure.

FIG. 19 depicts a method for an application to capture replay edits for sharing, according to embodiments of the present disclosure. In one or more embodiments, an image editing application, which may comprise a plurality of tools for editing image data, receives (1905) from a user a sequence of edits applied to input image data (e.g., a picture or video) to create final image data (e.g., a final edited picture or final edited video). The user may indicate that they want to save the edits as a replay for sharing. In one or more embodiments, responsive to receiving a replay indicator form the user via the application to save the sequence of edits used in generating the final image data as a form of edit template, the application saves (1910) the replay edit data, which may comprise, for each edit in the sequence of edits, an indicator of which tool was used for the edit and a set of one or more tool parameters applied for the edit. And, in one or more embodiments, responsive to receiving an indicator from the user that they want to share the final image data and the replay edit data, the application causes (1915) the final image data and an indicator that the posted final data has replay edit data associated with it to be posted. For example, FIG. 18 depicts an example method for a networked service to receive the final image data and the replay edit data from an application and post it for third parties to access.

Figure 20:
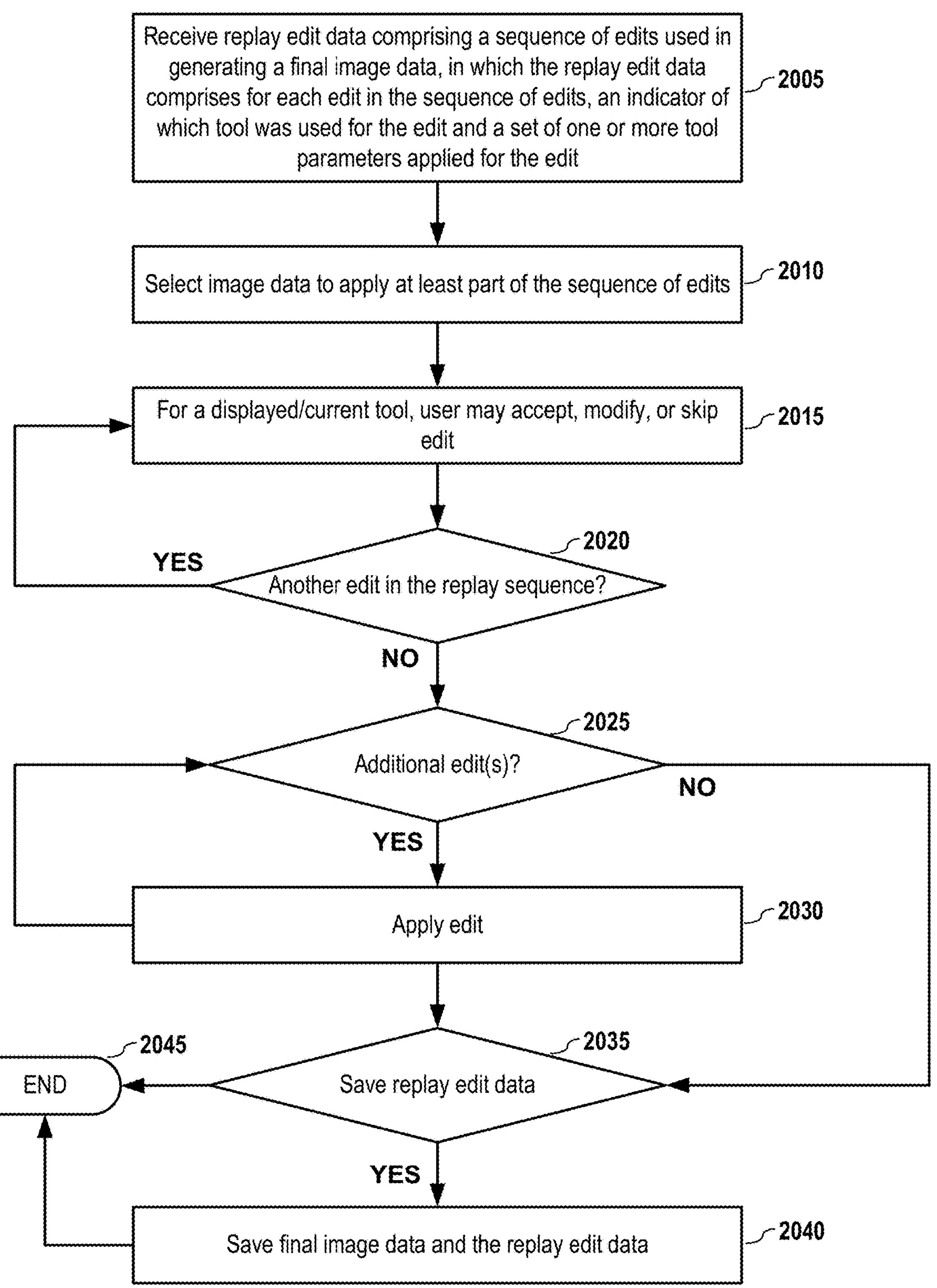
FIG. 20 depicts a method by which a third party may use an application to apply replay edits to image data, according to embodiments of the present disclosure.

FIG. 20 depicts a method by which a third party may use an application to apply replay edits to image data, according to embodiments of the present disclosure. In one or more embodiments, the image edit application includes a replay navigator or player, which a user may use to edit image data with the help of replay edit data. In one or more embodiments, the third party, via the application, receives (2005) replay edit data, which comprises a sequence of edits used in generating a final image data. The user may then select (2010) image data (e.g., a picture or video) to which the sequence of edits, or at least part of the sequence of edits, will be applied.

As displayed above, a replay navigator functionality or feature of the image editing application may allow the user to step through the sequence of edits. In one or more embodiments, for a displayed/current tool (see, for example, FIG. 17A, which shows a navigate view of the current step, step 5, of the sequence), the user may accept, modify, or skip edit. As noted previously, the parameters used by the created of the replay may be the default applied to image, but as shown in FIG. 17B, the user may use the tool to modify one or more parameters 1705. In one or more embodiments, modifying the edit may involve replacing the edit with a completely different edit.

In one or more embodiments, the user uses (2015) the replay navigator to step through the sequence until there are no more (2020). In one or more embodiments, the image edit application, whether through a separate editing portion of the application or via the replay navigator, may allow the user to make (2025, 2030) additional edits.

In one or more embodiments, the application may allow the user to capture their sequence of edits for a replay. For example, FIG. 16A show a button 1602, which allows the user to indicate their desire to create replay edit data for their edit. Furthermore, the user may also choose to share the replay by, for example, selecting "post" button 1605 in FIG. 16A, which invokes one or more of the methods discussed above. Alternatively, they may not, at least at that time, choose to share the replay data. In either event, the process of using the replay edit data from the original provider may, in embodiments, conclude (2045).

One skilled in the art shall recognize several beneficial features of embodiments disclosed herein. Embodiments of the replay information allow a user to view the end result, the original image as well as each phase of the editing process, step-by-step that was applied to create the end result made by the creator. A consumer can easily (e.g., with one click of a button) one step or every step in the replay to their own image without having to figure out how to use the tool(s) or find the image resources. In one or more embodiments, the user may have the option to modify each editing step, i.e., adjust parameters (e.g., resize, delete, adjust, change filter option) using the player. Additionally, a user can easily make additional alterations or edits and easily make their own remix-replay data for sharing.

It is noted that the approaches described herein may be applied to multiple media types, such as slideshow creation or video editing. It should be noted that the remix-replay features also make it very easy to replication certain edits for multiple images/videos. For instance, a videographer may post several short videos and want to overlay their watermark on a portion or all of the image/video. Using remix-replay, a user can quickly and easily apply the same replay to several of their own images/videos footage-shortcutting repetitive edits.

5. COMPUTING SYSTEM EMBODIMENTS

In embodiments, one or more computing system may be configured to perform one or more of the methods, functions, and/or operations presented herein. Systems that implement at least one or more of the methods, functions, and/or operations described herein may have an application or applications operating on at least one computing system. The computing system may have one or more computers and one or more databases. The computer system may be a single system, a distributed system, a cloud-based computer system, or a combination thereof.

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more disk drives, one or more network ports for communicating with external devices as well as various input and output (I/O) devices, such as a keyboard, mouse, stylus, touchscreen, and/or video display. The computing system may also include one or more buses operable to transmit communications between the various hardware components.

Figure 21:
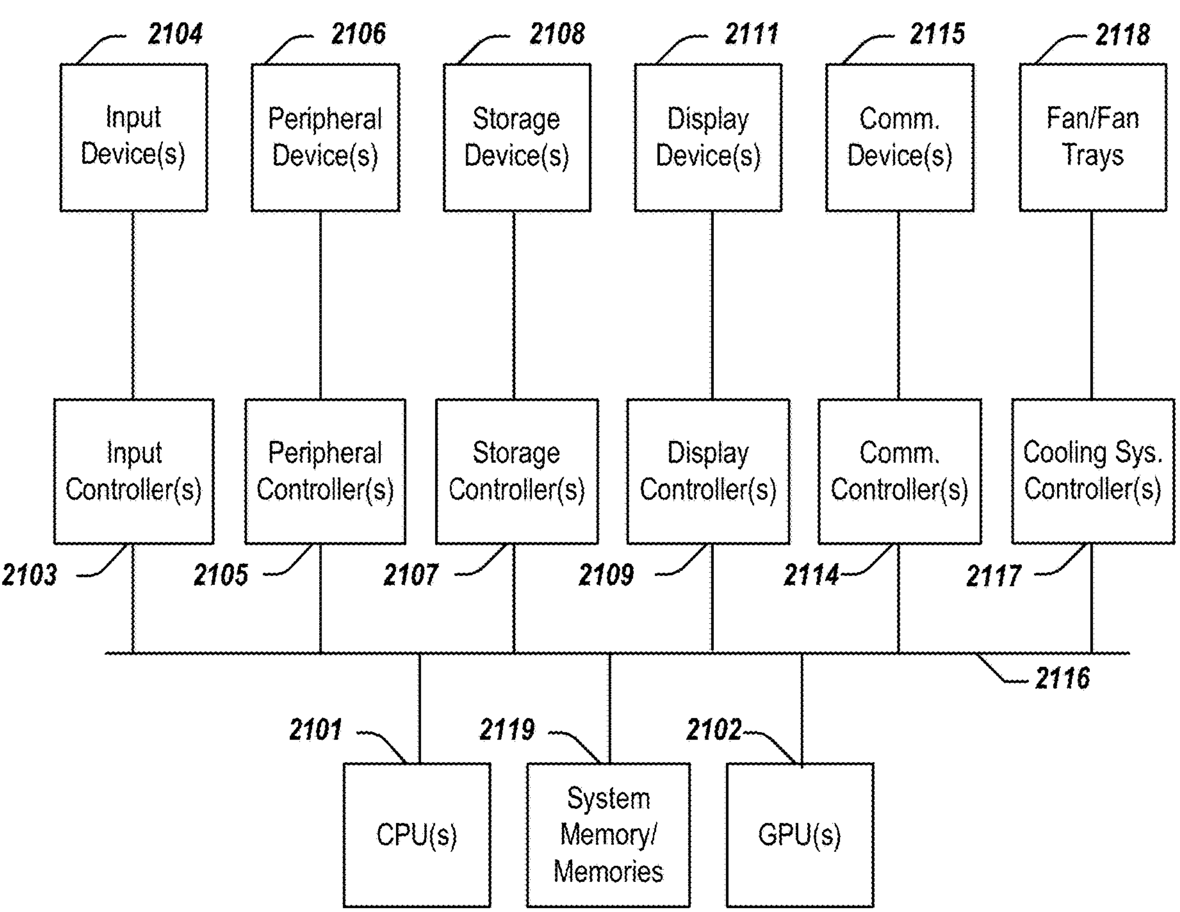
FIG. 21 shows a computing system according to embodiments of the present disclosure.

FIG. 21 depicts a simplified block diagram of an information handling system (or computing system), according to embodiments of the present disclosure. It will be understood that the functionalities shown for system 2100 may operate to support various embodiments of a computing system—although it shall be understood that a computing system may be differently configured and include different components, including having fewer or more components as depicted in FIG. 21.

As illustrated in FIG. 21, the computing system 2100 includes one or more central processing units (CPU) 2101 that provides computing resources and controls the computer. CPU 2101 may be implemented with a microprocessor or the like and may also include one or more graphics processing units (GPU) 2102 and/or a floating-point coprocessor for mathematical computations. In one or more embodiments, one or more GPUs 2102 may be incorporated within the display controller 2109, such as part of a graphics card or cards. The system 2100 may also include a system memory 2119, which may comprise RAM, ROM, or both.

A number of controllers and peripheral devices may also be provided, as shown in FIG. 21. An input controller 2103 represents an interface to various input device(s) 2104, such as a keyboard, mouse, touchscreen, and/or stylus. The computing system 2100 may also include a storage controller 2107 for interfacing with one or more storage devices 2108 each of which includes a storage medium such as magnetic tape or disk, or an optical medium that might be used to record programs of instructions for operating systems, utilities, and applications, which may include embodiments of programs that implement various aspects of the present disclosure. Storage device(s) 2108 may also be used to store processed data or data to be processed in accordance with the disclosure. The system 2100 may also include a display controller 2109 for providing an interface to a display device 2111, which may be a cathode ray tube (CRT) display, a thin film transistor (TFT) display, organic light-emitting diode, electroluminescent panel, plasma panel, or any other type of display. The computing system 2100 may also include one or more peripheral controllers or interfaces 2105 for one or more peripherals 2106. Examples of peripherals may include one or more printers, scanners, input devices, output devices, sensors, and the like. A communications controller 2114 may interface with one or more communication devices 2115, which enables the system 2100 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 2100 comprises one or more fans or fan trays 2118 and a cooling subsystem controller or controllers 2117 that monitors thermal temperature(s) of the system 2100 (or components thereof) and operates the fans/fan trays 2118 to help regulate the temperature.

In the illustrated system, all major system components may connect to a bus 2116, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, for example: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method comprising:

storing template data for a particular image associated with a user, wherein the template data includes a sequence of sets of edit instructions, wherein each set of edit instructions corresponds to a version of the particular image associated with the user;

wherein a sequence of edited image versions of the particular image associated with the user includes an initial version of the particular image, a sequence of subsequent edited versions of the particular image and a final edited version of the particular image, thereby each image in the sequence of edited image versions corresponds to a version of the particular image associated with the user, wherein, when a first set of edit instructions in the sequence of sets of edit instructions is applied to the initial version of the particular image associated with the user, a first version in the sequence of subsequent edited versions of the particular image is generated, and when each next set of edit instructions in the sequence of sets of edit instructions is applied, the next version in the sequence of subsequent edited version of the particular image is generated until the final edited version of the particular image associated with the same user;

displaying a sequence of thumbnail images corresponding to the sequence of edited image versions of the particular image associated with the same user from the initial version of the particular image to the final edited version of the particular image associated with the same user, each next image version of the sequence of edited image versions associated with a corresponding set of edit instructions in the sequence of sets of edit instructions of the template data of the particular image.

2. The computer-implemented method of claim 1, further comprising playing back video based at least in part on the sequence of edited image versions of the particular image.

3. The computer-implemented method of claim 1, further comprising:

when displaying a certain image in the sequence of edited image versions corresponding to a certain set of edit instructions from the sequence of sets of edit instructions, highlighting certain thumbnail image of the sequence of thumbnail images corresponding to the certain set of edit instructions from the sequence of sets of edit instructions.

4. The computer-implemented method of claim 1, further comprising:

in response to receiving input to modify the template data, modifying the template data to generate modified template data that a) includes at least one modified set of edit instructions of the sequence of sets of edit instructions, b) includes a new set of edit instructions in addition to the sequence of sets of edit instructions, or c) excludes at least one set of edit instructions of the sequence of sets of edit instructions.

5. The computer-implemented method of claim 1, further comprising:

applying the template data to a pre-edited version of a second image that is different from the particular image, thereby modifying the pre-edited version of the second image according to the template data and generating an edited version of the second image.

6. The computer-implemented method of claim 1, further comprising:

receiving input to modify at least one set of edit instructions of the sequence of sets of edit instructions of the template data to generate modified template data with at least one modified set of edit instructions of the sequence of sets of edit instructions of the template data.

7. The computer-implemented method of claim 1, further comprising:

modifying the template data to generate modified template data by modifying one or more parameters associated with at least one set of edit instructions of the sequence of sets of edit instructions of the template data.

8. The computer-implemented method of claim 1, further comprising:

receiving input to delete at least one set of edit instructions of the sequence of sets of edit instructions of the template data, thereby generating modified template data that excludes at least one deleted set of edit instructions of the sequence of sets of edit instructions.

9. The computer-implemented method of claim 1, further comprising:

displaying, by an image editing application, one or more tools from a plurality of tools for image editing.

10. The computer-implemented method of claim 1, further comprising:

receiving input to modify the template data to generate modified template data that includes a new set of edit instructions in addition to the sequence of sets of edit instructions.

11. A system comprising:

one or more processors;

an input/output component, communicatively coupled to at least one of the one or more processors, for receiving input from and displaying information to a user; and a non-transitory computer-readable medium or media comprising one or more sets of instructions which, when executed by at least one of the one or more processors, causes steps to be performed comprising:

storing template data for a particular image associated with the user, wherein the template data includes a sequence of sets of edit instructions, wherein each set of edit instructions corresponds to a version of the particular image associated with the user;

wherein a sequence of edited image versions of the particular image of the user includes an initial version of the particular image, a sequence of subsequent edited versions of the particular image and a final edited version of the particular image, thereby each image in the sequence of edited image versions corresponds to a version of the particular image associated with the user;

wherein, when a first set of edit instructions in the sequence of sets of edit instructions is applied to the initial version of the particular image associated with the user, a first version in the sequence of subsequent edited versions of the particular image is generated, and when each next set of edit instructions in the sequence of sets of edit instructions is applied, the next version in the sequence of subsequent edited version of the particular image is generated until the final edited version of the particular image associated with the same user;

displaying a sequence of thumbnail images corresponding to the sequence of edited image versions of the particular image associated with the same user from the initial version of the particular image to the final edited version of the particular image associated with the same user, each next image version of the sequence of edited image versions associated with a corresponding set of edit instructions in the sequence of sets of edit instructions of the template data of the particular image.

12. The system of claim 11, wherein the one or more sets of instructions include instructions which, when executed by at least one of the one or more processors, cause playing back video based at least in part on the sequence of edited image versions of the particular image.

13. The system of claim 11, wherein the one or more sets of instructions include instructions which, when executed by at least one of the one or more processors, cause:

when displaying a certain image in the sequence of edited image versions corresponding to a certain set of edit instructions from the sequence of sets of edit instructions, highlighting certain thumbnail image associated with the sequence of thumbnail images corresponding to the certain set of edit instructions from the sequence of sets of edit instructions.

14. The system of claim 11, wherein the one or more sets of instructions include instructions which, when executed by at least one of the one or more processors, cause:

in response to receiving input to modify the template data, modifying the template data to generate modified template data that a) includes at least one modified set of edit instructions of the sequence of sets of edit instructions, b) includes a new set of edit instructions in addition to the sequence of sets of edit instructions, or c) excludes at least one set of edit instructions of the sequence of sets of edit instructions.

15. The system of claim 11, wherein the one or more sets of instructions include instructions which, when executed by at least one of the one or more processors, cause:

applying the template data to a pre-edited version of a second image that is different from the particular image, thereby modifying the pre-edited version of the second image according to the template data and generating an edited version of the second image.

16. The system of claim 11, wherein the one or more sets of instructions include instructions which, when executed by at least one of the one or more processors, cause:

receiving input to modify at least one set of edit instructions of the sequence of sets of edit instructions of the template data to generate modified template data with at least one modified set of edit instructions of the sequence of sets of edit instructions of the template data.

17. The system of claim 11, wherein the one or more sets of instructions include instructions which, when executed by at least one of the one or more processors, cause:

modifying the template data to generate modified template data by modifying one or more parameters associated with at least one set of edit instructions of the sequence of sets of edit instructions of the template data.

18. The system of claim 11, wherein the one or more sets of instructions include instructions which, when executed by at least one of the one or more processors, cause:

receiving input to delete at least one set of edit instructions of the sequence of sets of edit instructions of the template data, thereby generating modified template data that excludes at least one deleted set of edit instructions of the sequence of sets of edit instructions.

19. The system of claim 11, wherein the one or more sets of instructions include instructions which, when executed by at least one of the one or more processors, cause:

displaying, by an image editing application, one or more tools from a plurality of tools for image editing.

20. The system of claim 11, wherein the one or more sets of instructions include instructions which, when executed by at least one of the one or more processors, cause:

receiving input to modify the template data to generate modified template data that includes a new set of edit instructions in addition to the sequence of sets of edit instructions.

* * * * *